US008806611B2

(12) United States Patent
Saroj et al.

(10) Patent No.: US 8,806,611 B2
(45) Date of Patent: Aug. 12, 2014

(54) MESSAGE ADMINISTRATION SYSTEM

(75) Inventors: Beena Saroj, Pleasanton, CA (US);
Brian Selsor, Kimmswick, MO (US);
Kavitha D. Kasiviswanathan, St. Charles, MO (US); Stefani A. Smith, House Springs, MO (US); Douglas F. Giacoletto, Collinsville, IL (US); David J. Schwent, St. Louis, MO (US); Timothy E. Braloski, Arnold, MO (US); Danny M. Marion, Wildwood, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1174 days.

(21) Appl. No.: 12/326,705

(22) Filed: Dec. 2, 2008

(65) Prior Publication Data
US 2010/0138913 A1 Jun. 3, 2010

(51) Int. Cl.
*G06F 21/22* (2006.01)
*G06F 21/62* (2013.01)
*G06F 9/54* (2006.01)
*G06F 9/48* (2006.01)

(52) U.S. Cl.
CPC ............ *G06F 21/6218* (2013.01); *G06F 9/546* (2013.01); *G06F 9/4881* (2013.01); *G06F 9/542* (2013.01)
USPC ............................................ 726/17; 370/338

(58) Field of Classification Search
USPC .......................................................... 726/17
See application file for complete search history.

(56) References Cited

U.S. PATENT DOCUMENTS

| 5,623,666 | A | 4/1997 | Pike et al. |
| 6,425,017 | B1 | 7/2002 | Dievendorff et al. |
| 7,149,698 | B2 * | 12/2006 | Guheen et al. ................ 705/319 |
| 7,315,826 | B1 * | 1/2008 | Guheen et al. ............... 705/7.29 |
| 7,499,458 | B2 * | 3/2009 | McDysan et al. ............. 370/396 |
| 7,730,523 | B1 * | 6/2010 | Masurkar .......................... 726/4 |
| 7,761,594 | B1 * | 7/2010 | Mowat ........................... 709/238 |
| 2002/0169706 | A1 * | 11/2002 | Chandra et al. ................. 705/37 |
| 2003/0046587 | A1 * | 3/2003 | Bheemarasetti et al. ..... 713/201 |
| 2003/0191795 | A1 * | 10/2003 | Bernardin et al. ............ 709/105 |
| 2005/0229236 | A1 * | 10/2005 | Devgan et al. .................... 726/1 |
| 2006/0034237 | A1 * | 2/2006 | Patrick et al. ................. 370/338 |

(Continued)

OTHER PUBLICATIONS

"IBM Websphere MQ", [Online]. Retrieved from the Internet: <URL:http://en.wikipedia.org/w/index.php?title=IBM_WebSphere_MQ&printable=yes>, (Nov. 6, 2008), 6 pgs.

(Continued)

*Primary Examiner* — Andrew Goldberg
(74) *Attorney, Agent, or Firm* — Hanley, Flight & Zimmerman, LLC

(57) ABSTRACT

Methods and systems for message administration are described. In one embodiment, an application request for an application associated with an administration tool may be accessed. The application request may be associated with a user. The application may be deployed on a system machine. A particular access level of a plurality of access levels may be identified for the user on the administration tool. The particular access level may identify functionality of the administration tool available to the user. A determination of whether to allow processing of the application request based on the particular access level may be made. When the application request meets the particular access level, communication with the system machine from the administration tool may be made based on the application request. The system machine may be capable of processing the application request. Additional methods and systems are disclosed.

19 Claims, 28 Drawing Sheets

(56) References Cited

U.S. PATENT DOCUMENTS

| | | | |
|---|---|---|---|
| 2006/0161554 A1* | 7/2006 | Lucovsky et al. | 707/10 |
| 2006/0212567 A1* | 9/2006 | Gulledge et al. | 709/224 |
| 2006/0248143 A1* | 11/2006 | Collison et al. | 709/204 |
| 2007/0038765 A1* | 2/2007 | Dunn | 709/229 |
| 2007/0180493 A1* | 8/2007 | Croft et al. | 726/2 |
| 2007/0192329 A1* | 8/2007 | Croft et al. | 707/10 |
| 2007/0240145 A1 | 10/2007 | Saroj et al. | |
| 2007/0240231 A1* | 10/2007 | Haswarey et al. | 726/28 |
| 2007/0261124 A1* | 11/2007 | Centonze et al. | 726/27 |
| 2007/0282951 A1* | 12/2007 | Selimis et al. | 709/205 |
| 2008/0133646 A1* | 6/2008 | Azulai | 709/202 |
| 2008/0147819 A1 | 6/2008 | Dettinger et al. | |
| 2008/0151304 A1 | 6/2008 | Matsugashita et al. | |
| 2008/0155086 A1 | 6/2008 | Jensen | |
| 2008/0167846 A1* | 7/2008 | Bugenhagen | 703/6 |
| 2008/0181247 A1 | 7/2008 | Kim et al. | |
| 2008/0209539 A1* | 8/2008 | Padmanabhuni et al. | 726/12 |
| 2009/0007223 A1* | 1/2009 | Centonze et al. | 726/1 |
| 2009/0249442 A1* | 10/2009 | Birgen et al. | 726/2 |
| 2010/0058197 A1* | 3/2010 | Chee et al. | 715/751 |

OTHER PUBLICATIONS

Fleissner, Sebastian, et al., "A Commensalistic Software system", OOPSLA'06, Oct. 22-26, 2006, 560-573.

Sangpachatanaruk, Chatree, et al., "A Simulation Study of the Proactive Server Roaming for Mitigating Denial of Service Attacks", Proceedings of the 36th Annual Simulation Symposium (ANSS'03), (2003), 1-8.

\* cited by examiner

- Welcome bs9518
- MQATool Administration
  - Server List
  - User Administration
  - Manage Queue Manager
    - Assign QMgr to Server
    - Assign User to Server
    - Assign Topic to QMgr
  - Change Password
  - Reset Password
- Queue Manager Operations
  - Create Queue Manager
  - Queue Management
  - Channel Management
- View/Get Queue Messages
- Browse Queue Messages
- Topic Operations
  - List Subscribers/UnSubscribe
- CCiST
  - Request Console
- Status
- Documents
- Logout

*Customer Care and Billing Retail Solutions* — MQATool — Infrastructure Support Team MQATool Administration Request Console

| Request ID | Request Date | Required Date | Application | Status | Submitted By | Assigned to | |
|---|---|---|---|---|---|---|---|
| 10011 | 08/26/2008 | 08/26/2008 | DEMO_26Aug08 | Submitted Via Web | GG5749 | null | History |
| 10010 | 08/25/2008 | 08/25/2008 | DEMO_TEST | Submitted Via Web | GG5749 | null | History |
| 10009 | 08/25/2008 | 08/25/2008 | DEMOK05 | Submitted Via Web | GG5749 | null | History |
| 10008 | 08/21/2008 | 08/22/2008 | DEMO_APP | Submitted Via Web | SV8619 | null | History |
| 10007 | 04/03/2008 | 04/03/2008 | TESTAPP4 | In Progress | SV8619 | Sabapathy Vijayan | History |
| 10006 | 04/03/2008 | 04/03/2008 | TESTAPP3 | Submitted Via Web | GG5749 | null | History |
| 10005 | 04/02/2008 | 04/15/2008 | TESTAPP | Submitted Via Web | SV8619 | Girish Ghude | History |
| 10004 | 04/01/2008 | 04/15/2008 | TESTAPP2 | Submitted Via Web | SV8619 | Sabapathy Vijayan | History |
| 10003 | 03/31/2008 | 04/30/2008 | TESTAPP | Submitted Via Web | GG5749 | null | History |
| 10001 | 12/11/2005 | 12/11/2005 | Demo Application | In Progress | TV8934 | Sabapathy Vijayan | History |
| 5047 | 12/16/2005 | 12/23/2005 | TCS-Lightspeed | In Progress | DL8628 | Doug Giacoletto | History |
| 1032 | 12/16/2005 | 12/23/2005 | ASON-Due Date | In Progress | DL8628 | Tim Braloski | History |
| 1031 | 01/12/2006 | 04/08/2006 | EASE | In Progress | NB3129 | Tim Braloski | History |
| 1028 | 01/12/2006 | 01/20/2006 | ESON | In Progress | JB4589 | Tim Braloski | History |
| 1027 | 12/16/2005 | 12/23/2005 | ESON-Lightspeed | In Progress | DL8628 | Tim Braloski | History |
| 1026 | 12/15/2005 | 12/23/2005 | TCS | In Progress | DL8628 | Tim Braloski | History |
| 1024 | 12/07/2005 | 12/23/2005 | EASE DUE DATE | In Progress | RP8465 | Tim Braloski | History |
| 1023 | 12/07/2005 | 12/22/2005 | EASE | Submitted Via Web | RP8465 | Tim Braloski | History |
| 1020 | 11/22/2005 | 12/23/2005 | EASE | Submitted Via Web | SS4541 | Tim Braloski | History |
| 1019 | 11/17/2005 | 11/18/2005 | Testina | Submitted Via Web | KV3653 | Tim Braloski | History |

[ Contacts ] [ Feedback ] [ Support ]

FIG. 10

MESSAGE ADMINISTRATION SYSTEM

FIELD

This application relates to method and systems for message processing, and more specifically to methods and systems for message administration. The application may relate, in an example embodiment, to methods and systems for handling application requests, poison messages, and/or subscribers of a topic.

BACKGROUND

Applications may be configured to communicate among one another and with other applications through messaging. The messages may include collections of binary or character data that have meaning to the applications. Storage, routing, and delivery information may be added to the message before transmission and stripped from the message prior to delivery to the receiving application.

Message queues may store messages in an application. A queue manager may be responsible for transferring data to other queue managers via message channels.

When the applications are not integrated, a manual process may be used to manage non-integrated parts. For example, the process may be manually run by first logging into the machine on which an application is running and then applying the command.

BRIEF DESCRIPTION OF THE DRAWINGS

Some embodiments are illustrated by way of example and not limitation in the figures of the accompanying drawings in which:

FIGS. 7-14 are user interfaces that may be presented during the methods of FIG. 5 and/or FIG. 6, according to example embodiments;

DETAILED DESCRIPTION

Example methods and systems for message administration are described. In the following description, for purposes of explanation, numerous specific details are set forth in order to provide a thorough understanding of example embodiments. It will be evident, however, to one of ordinary skill in the art that embodiments of the invention may be practiced without these specific details.

An administration tool may automate administrative functions associated with the management of a number of applications running on one or more system machines. The administrative functions may include, by way of example, controlling administrative jobs, reviewing messages that are on a queue, handling subscribing and unsubscribing messages, handling problem resolution (e.g., identifying a poison message and taking it off the queue), and handling remote configurations. The administration tool may provide flexibility for remote administration of the applications while including security features.

The administration tool may list and unsubscribe subscriptions to topics, browse and offload selected non-poison and poison messages (e.g., to a file), provide assignment of groups and/or environments, provide role-based security to carry out various operations in the administration tool, and/or support the use of SecurID.

Figure 1:
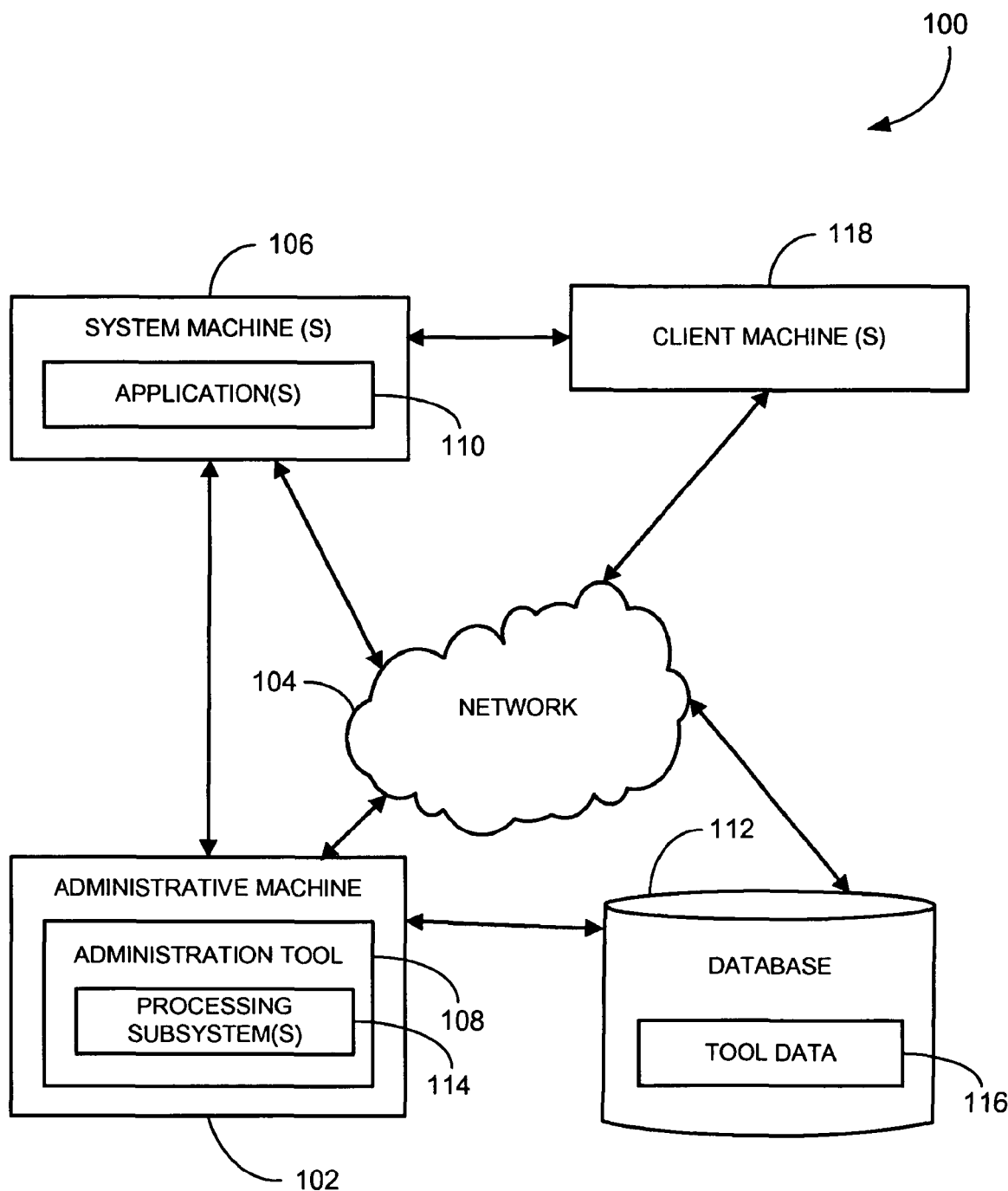
FIG. 1 is a block diagram of a system, according to an example embodiment.

FIG. 1 illustrates an example system 100 in which a user may operate an administrative machine 102 may communicate over a network 104 with one or more system machines 106. An administration tool 108 may be running on the administrative machine 102 to remotely manage one or more applications 110 running on the one or more system machines 106.

Examples of the administrative machine 102 and/or the system machines 106 include a set-top box, a gaming unit, a receiver card, a set-top box (STB), a mobile phone, a personal digital assistant (PDA), a display device, a generic computing system, or the like. Other devices may also be used.

The network 104 over which the administrative machine 102 and the system machines 106 are in communication may include a Global System for Mobile Communications (GSM) network, an Internet Protocol (IP) network, a Wireless Application Protocol (WAP) network, a WiFi network, or an IEEE 802.11 standards network as well as various combinations thereof. Other conventional and/or later developed wired and wireless networks may also be used.

The administrative machine 102 and/or the system machines 106 may be a computing system or other computing device operated or under control of AT&T, or another telecommunication entity or non-telecommunication entity. The administrative machine 102 may be in a client-server relationship, peer-to-peer, or different type of relationship with the system machines 106.

The administration tool 108 may provide a graphical user interface or a different type of interface to enable a user operation. The administration tool 108 may be a web-based application, or may be otherwise implemented. The administration tool 108 may be programmed in the Java programming language (e.g., J2EE); however, other programming languages, including C++ and C#, may also be used.

The administration tool 108 may automate and centralize remote administration of a queue manager to carry out frequently used administrative tasks in a highly flexible and standardized process. For example, the administration tool 108 may be used to create additional queue managers remotely.

The administration tool 108 may provide remote administration of a queue manager (e.g., by a tool administrator). The tasks performed by remote administration may include, by way of example, add queue, update queue, delete queue, add channel, update channel, and/or delete channel.

Remote administration may, in an example embodiment, be achieved with the help of programmable command format (PCF) interface. The PCF interface may allow greater efficiency to manipulate queue manager objects (queues, process definitions, namelists, channels, client connection channels, listeners, services, authentication information objects, etc.), and even manipulate the queue managers themselves.

Each PCF command may be in a data structure that is embedded in the application data part of a message. Each command may be sent to the target queue manager using a MQI (MQ interface) function MQPUT in the same way that other messages are sent. A command server running on the queue manager may receive the message and interpret it as a command message and run the command. The application 110 may issue an MQGET call, and the reply data may be returned in another data structure. The application 110 may then process the reply and act accordingly.

In an example, the administration tool 108 may create multiple objects (e.g., queues and channels) in multiple queue managers running on different hosts and/or different operating systems (OS). The administration tool 108 may be operable with IBM WebSphere® MQ or other application communication implementations.

The administration tool 108 may provide role-based security to carry out various operations. User authorization or authentication may be based on a role. For example, a number of groups may be provided with certain privileges. A user may then be assigned to a group.

Access may be controlled at the administration tool 108 instead of at the individual resource. For example, one or more tool administrators can grant or deny certain levels of access and/or activity within the administration tool 108. The administration tool 108 may be configured for access so that access need not be configured on individual machines.

The administration tool 108 may interface with a CSID MQ series support site to get MQ related requests and carry out the operations automatically, provide a status page to store and view all the various operations performed using the administration tool 108, and/or provide email notification to all the designated users of the operations performed by the administration tool 108.

The administration tool 108 may be platform independent. The administration tool 108 may, by way of example, communicate with applications 110 running on running on operating systems such as z/OS®, OS/400®, Transaction Processing Facility, UNIX® (e.g., AIX®, HP-UX®, Solaris®), HP NonStop™, OpenVMS®, Linux®, and/or Microsoft Windows®. For example, a particular restriction can be implemented within the administration tool 108 and applied across multiple platforms. The applications 110 may communicate with one another through WEBSPHERE®, WEBLOGIC®, or on a different JAVA™ or non-JAVA platform.

The administration tool 108 may support MQ servers V5.x and V6.x running on Windows, AIX, Sun Solaris and Tandem. However, other servers may also be supported.

The administrative machine 102 and/or the system machines 106 may be in communication with a database 112.

The database 112 may be used to store information received from the administrative machine 102 and/or the system machines 106. A single database 112 may be used to store the information received from the administrative machine 102 and/or the system machines 106, or different databases may be used. The database 112 may include tool data 116. The tool data may include information regarding operation, users, user groups, and/or history of the administration tool 108.

In an example embodiment, the use of the administration tool 108 may reduce the time taken to complete administration and configuration by 90% when compared with manual administration and configuration.

A user (e.g., a standard user) may operate a client machine 118 to communicate remotely with the administration tool 108.

Figure 2:
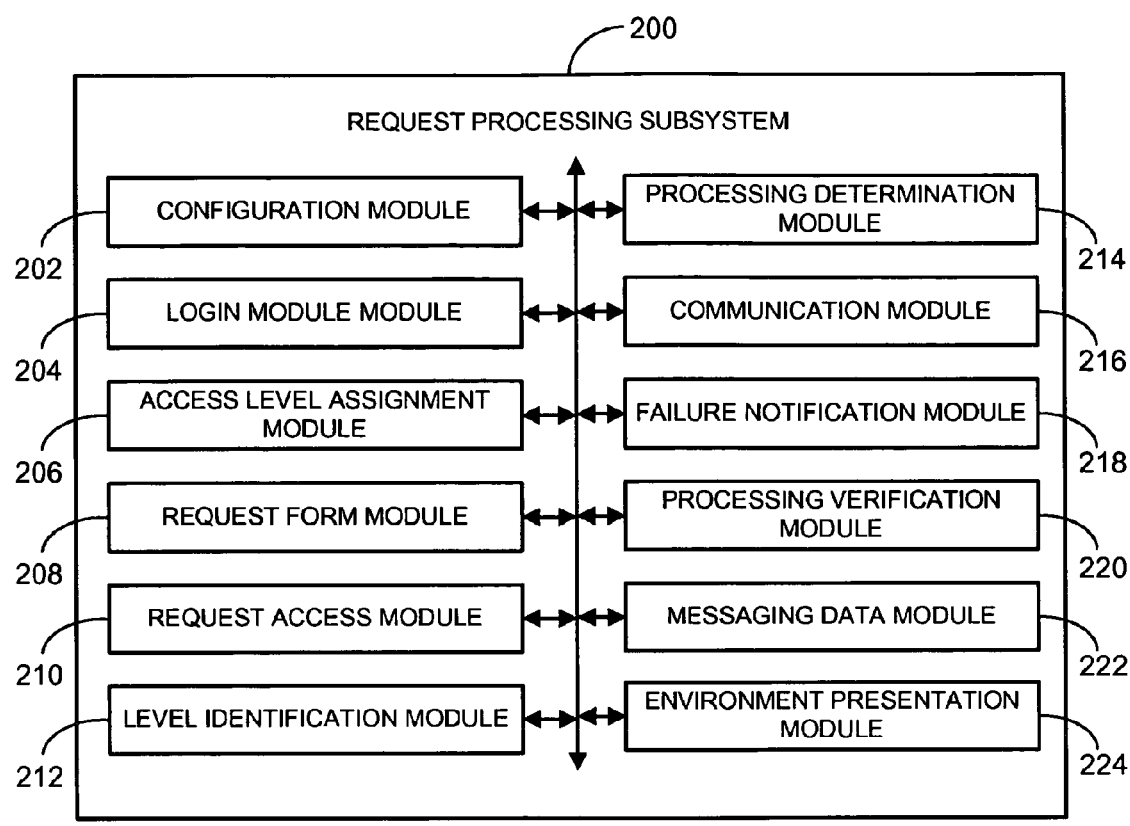
FIGS. 2-4 are block diagrams of example processing subsystems that may be deployed within the system of FIG. 1, according to example embodiments.

FIG. 2 illustrates an example request processing subsystem 200 that may be deployed as the processing subsystem 114 in the administrative machine 102 of the system 100 (see FIG. 1), or otherwise deployed in another system. The request processing subsystem 200 may include a configuration module 202, a login module 204, an access level assignment module 206, a request form module 208, a request access module 210, a level identification module 212, a processing determination module 214, a communication module 216, a failure notification module 218, a processing verification module 220, a messaging data module 222, and/or environment presentation module 224. Other modules may also be included. In various embodiments, the modules may be distributed so that some of the modules may be deployed in the administrative machine 102 and some of the modules may be deployed in another machine.

The configuration module 202 configures the administration tool 108 to communicate with the system machines 106. The login module 204 receives and/or processes a login request of the user. The login request may include a user identifier and a password, a token, or the like.

The access level assignment module 206 assigns an access level to the user. The request form module 208 receives information from a request form, generates the application request based on the information, notifies the tool administrator of the administration tool 108 of the application request, and/or receives an approval from the tool administrator in response to notifying the tool administrator.

The request access module 210 accesses an application request for the application 110 associated with the administration tool 108, accesses an initial application request for the application 110 associated with the administration tool 108, and/or accesses an additional application request for an additional application 110 associated with the administration tool 108. The application request may be associated with a user. The access of the application request may be based on the presentation of the environment and/or in response to receiving the approval. The initial application request and/or the additional application request may be associated with the user. The additional application 110 may use a different platform than the application 110.

The level identification module 212 identifies a particular access level of available access levels for the user. The particular access level may identify functionality of the administration tool 108 available to the user.

By way of example, users may be assigned one of three different roles-standard user, tool administrator, and the super-user. The role of a standard user may be assigned to developers and other users that do not have the delete functions or any other higher privileges on the administration tool 108. For example, a standard user may not be able to create an objection on a production server or desk server operating on the system machines 106. Rather, they may be restricted only to the development environment. The tool administrator may maintain the applications 110 and the system machines 106. The tool administrator may have increased accessed to functionality than standard users. The super-user may be able to appoint tool administrators and be able to perform any functions performed by tool administrators.

The processing determination module 214 determines whether to allow processing of the application request based on the particular access level, determines whether to allow processing of the initial application request based on the particular access level, and/or determines whether to allow processing of the additional application request based on the particular access level.

The communication module 216 communicates with the system machines 106 based on the application request when the application request meets the particular access level and/or communicates based on the additional application request when the additional application request meets the particular access level.

The failure notification module 218 provides a failure notification of a failure to process the initial application request based on a determination that the initial application request does not meet the particular access level.

The processing verification module 220 verifies that the processing of the application request is complete, provides user interface data based on the verifying, and/or provides a completion message based on the verifying.

The messaging data module 222 provides a messaging request to the system machines 106 and receives messaging data on the administration tool 108 from the system machines 106 through a feed. The environment presentation module 224 presents an environment based on a particular access level.

Figure 3:
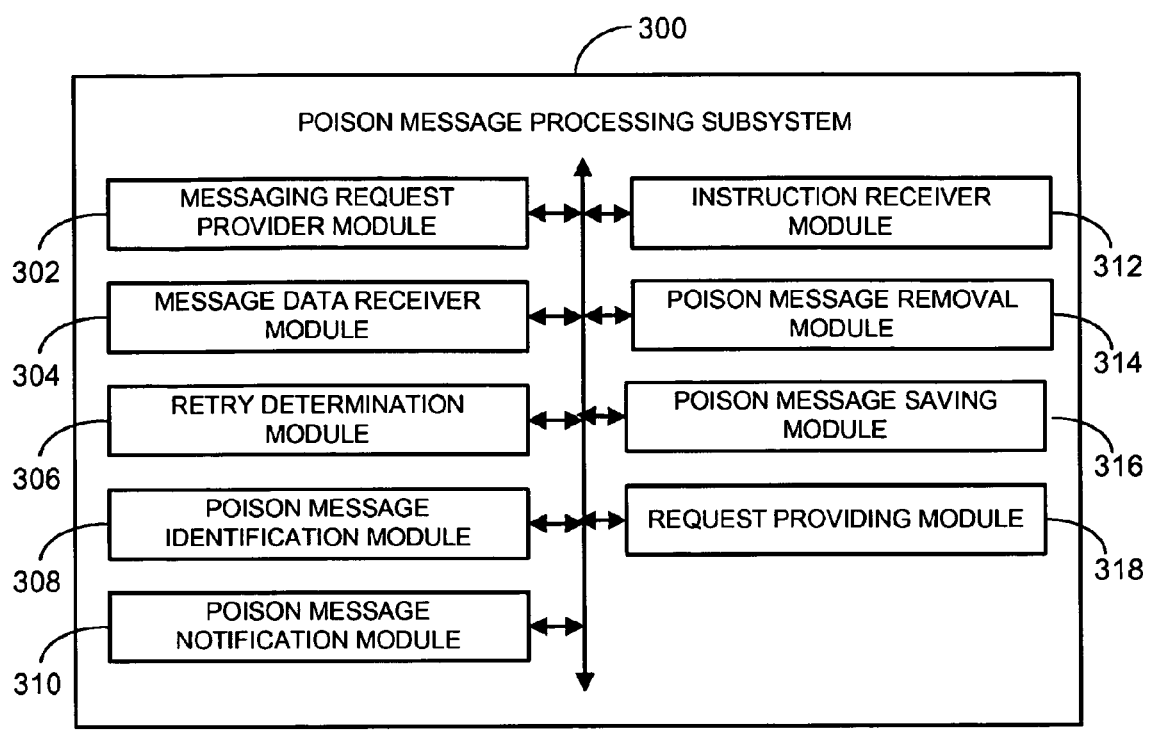

FIG. 3 illustrates an example poison message processing subsystem 300 that may be deployed as the processing subsystem 114 in the administrative machine 102 of the system 100 (see FIG. 1) or otherwise deployed in another system. The poison message processing subsystem 300 may include a messaging request provider module 302, a message data receiver module 304, a retry determination module 306, a poison message identification module 308, a poison message notification module 310, an instruction receiver module 312, a poison message removal module 314, a poison message saving module 316, and/or a request providing module 318. Other modules may also be included. In various embodiments, the modules may be distributed so that some of the modules may be deployed in the administrative machine 102 and some of the modules may be deployed in another machine.

The messaging request provider module 302 provides a messaging request to the application 110. The message data receiver module 304 receives messaging data associated with a messaging service message in a queue from the application 110. The receipt of the messaging data may be in response to providing the messaging request.

The retry determination module 306 determines whether a particular message of the messaging service messages has exceeded a maximum number of retries. The poison message identification module 308 identifies a poison message among the messaging service messages. The identification of the poison message may be based on a determination that the particular message has exceeded the maximum number of retries.

The poison message notification module 310 provides a poison message notification based on identification of the poison message. The instruction receiver module 312 receives a processing instruction for the poison message.

The poison message removal module 314 removes the poison message from the queue in response to receipt of the processing instruction. For example, the poison message may be moved to a dead letter queue. The poison message saving module 316 saves the poison message (e.g., to a file in the database 112). The request providing module 318 provides a queue creation request to the application.

Figure 4:
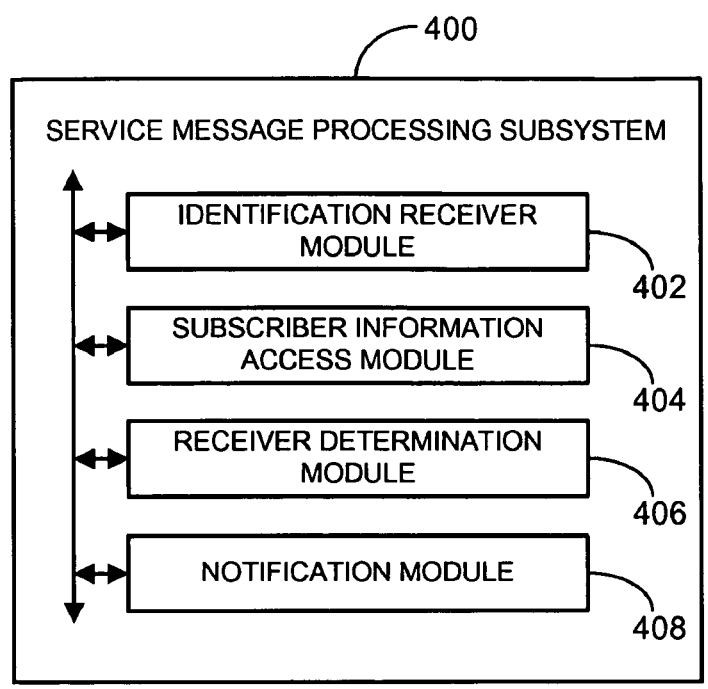

FIG. 4 illustrates an example service message processing subsystem 400 that may be deployed as the processing subsystem 114 in the administrative machine 102 of the system 100 (see FIG. 1) or otherwise deployed in another system. The service message processing subsystem 400 may include an identification receiver module 402, a subscriber information access module 404, a receiver determination module 406, and/or a notification module 408. Other modules may also be included. In various embodiments, the modules may be distributed so that some of the modules may be deployed in the administrative machine 102, and some of the modules may be deployed in another machine.

The identification receiver module 402 receives identification of a number of subscribers of a topic. The subscriber information access module 404 accesses subscriber information for the subscribers.

The receiver determination module 406 determines whether one or more subscribers of the available subscribers should not receive a messaging service message from the application 110 based on the subscriber information.

The notification module 408 notifies the application 110 regarding a result of the determination. The notification may include removing a particular subscriber from the subscribers of the topic, clearing the subscribers of the topic, and/or presenting the identification of the subscribers of the topic.

Figure 5:
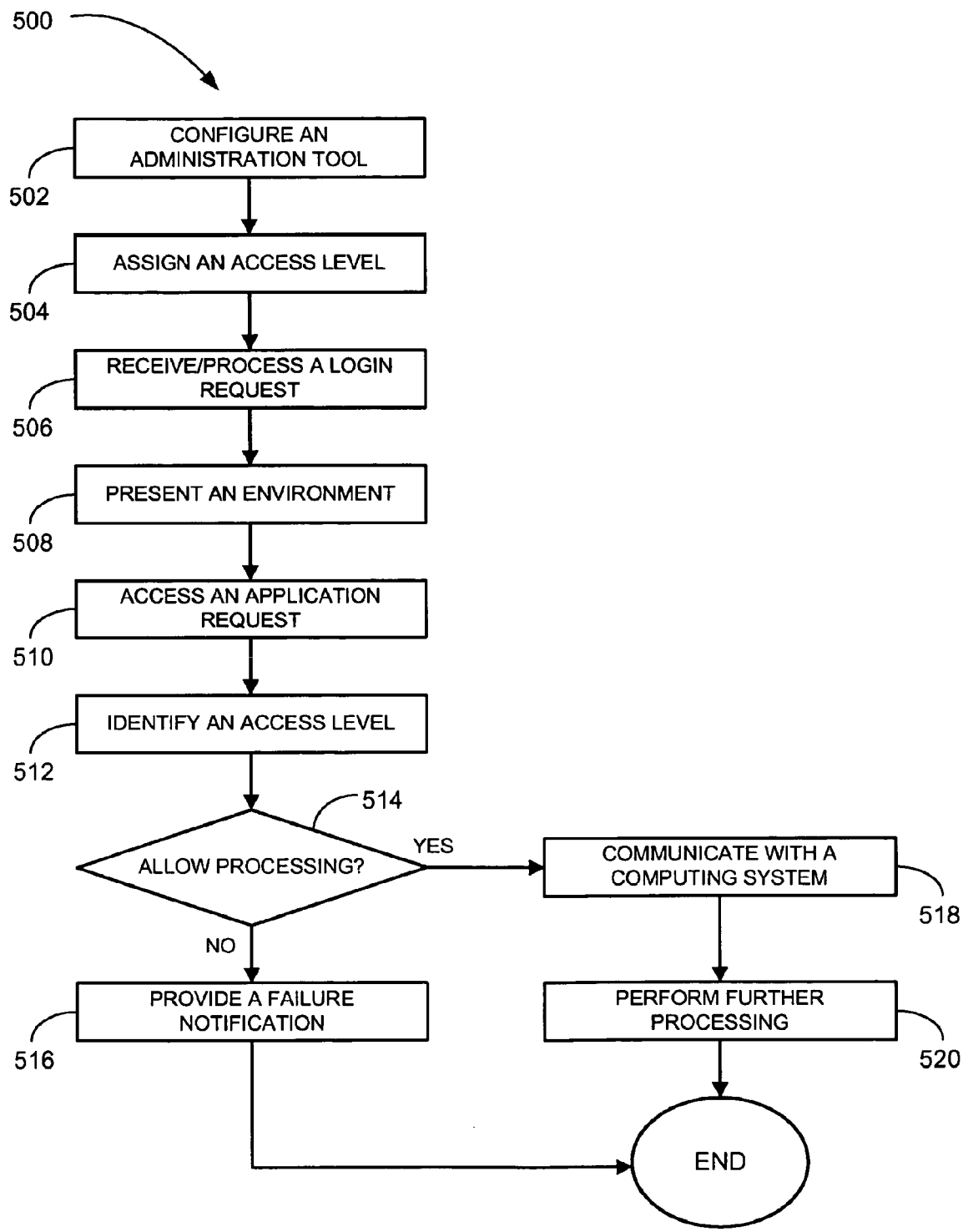
FIGS. 5 and 6 are block diagrams of flowcharts illustrating methods for request processing, according to example embodiments.

FIG. 5 illustrates a method 500 for request processing according to an example embodiment. The method 500 may be performed by the administrative machine 102 (see FIG. 1) of the system 100, or it may be otherwise performed.

The administration tool 108 may be configured to communicate with one or more of the system machines 106 at block 502.

An access level of a number of available access levels may be assigned to the user at block 504. The access level may provide restricted access to the system machines 106. The access levels may include, by way of example, a standard user access level, an administrator access level, or a super user access level. The access levels may include a number of roles for the administration tool 108.

A login request for the user may be received and/or processed at block 506. An environment may be presented to the user at block 508 based on the access level of the user.

An application request for the application 110 associated with the administration tool 108 may be accessed at block 510. The application request may be associated with a user. The application request may include, by way of example, queue creation, queue deletion, channel creation, channel deletion, queue existence verification, a channel request, or message review. The accessing of the application request may be based on the presentation of the environment.

In an example embodiment, the application request may be for the application 110 and an additional application 110 associated with the administration tool 108. The application 110 and the additional application 110 may be located in different physical locations (e.g., on different system machines 106).

An access level among a number of available access levels may be identified for the user at block 512. The access level may identify functionality of the administration tool 108 available to the user.

At decision block 514, a determination of whether to allow processing of the application request based on the particular access level may be made. When a determination is made that the application request does not meet the particular access level, a failure notification of a failure to process the application request may be provided at block 516. When a determination is made that the application request meets the particular access level at decision block 514, communication with the system machine 106 may be made based on the application request at block 518. Further processing may be performed at block 520.

Figure 6:
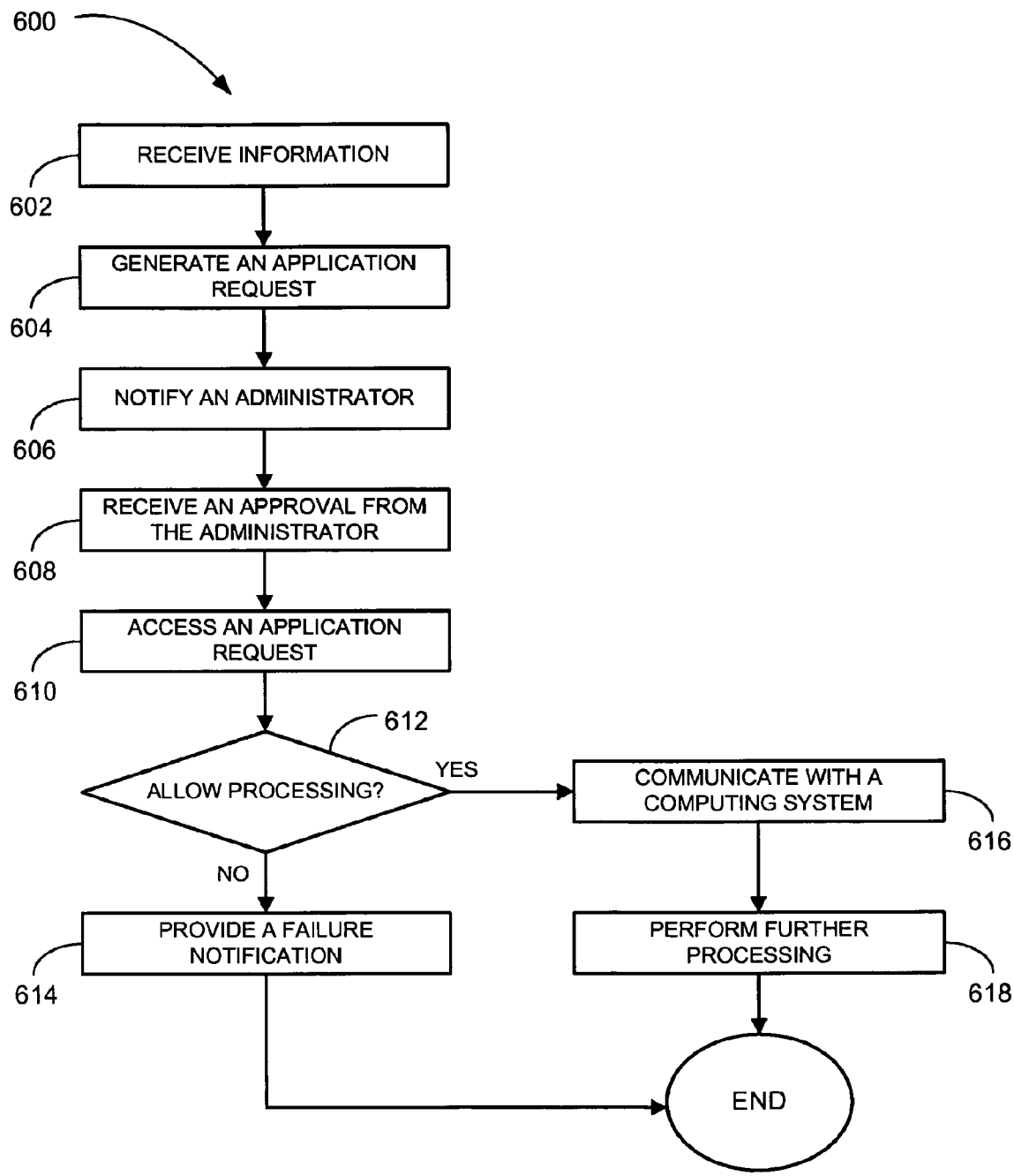

FIG. 6 illustrates a method 600 for request processing according to an example embodiment. The method 600 may be performed by the administrative machine 102 (see FIG. 1) of the system 100, or it may be otherwise performed.

Information may be received from a request form at block 602. The application request may be generated at block 604 based on the information received from the request form at block 602.

The tool administrator of the administration tool 108 may be notified of the application request at block 606. An approval may be received from the tool administrator at block 608 in response to notifying the tool administrator.

An application request for an application associated with the administration tool 108 may be accessed at block 610. The accessing of the application request may be in response to receiving the approval. The application request may be associated with a user.

At decision block 612, a determination of whether to allow processing of the application request based on the particular access level may be made. If a determination is made that the application request does not meet the particular access level, a failure notification of a failure to process the application request may be provided at block 614. If a determination is made that the application request meets the particular access level at decision block 612, the system machines 106 may be communicated with based on the application request at block 616.

Further processing may be performed at block 618.

Figure 7:
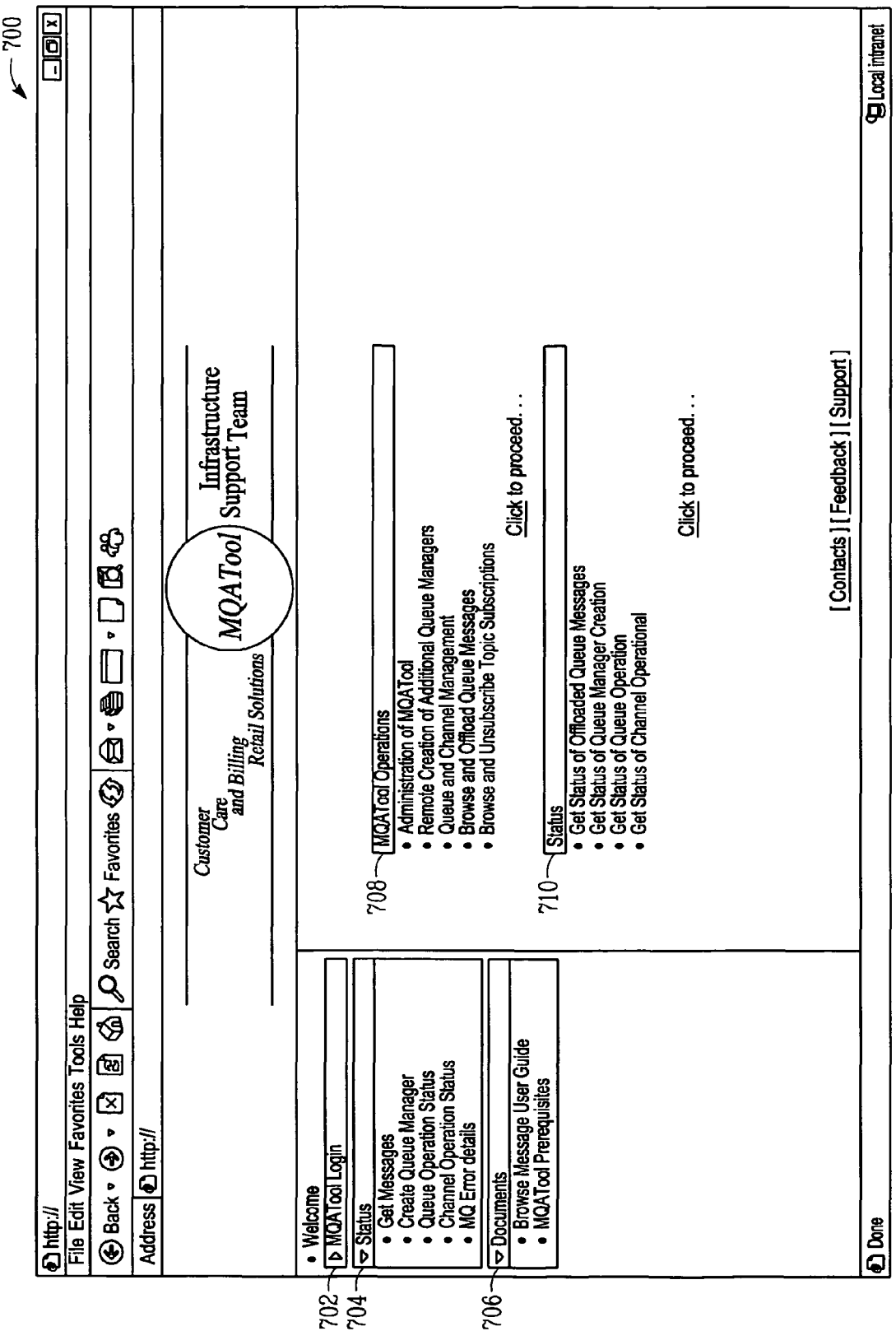

FIG. 7 illustrates an example user interface 700 according to an example embodiment. The user interface 700 may be presented to a user prior to logging into the administration tool 108 (see FIG. 1). The user interface 700 may be presented to a user during the operations at block 502, block 504, and/or block 506 (see FIG. 5), or may be otherwise presented to the user. However, other user interfaces may also be presented to the user prior to login.

The user interface 700 may include a login selection 702, a status selection 704, a document selection 706, an operations selection 708, and a status selection 710. Other selections may also be included.

The login selection 702 may enable a user to login to the administration tool 108. The status selection 704 may enable a user to see the status of various operations of the administration tool 108. For example, the various operations may include get messages, create queue manager, queue operation status, channel operation status, and error details.

The document selection 706 may enable a user to browse message user guide and/or view suggested configurations and implementations of the administration tool 108. The operations selection 708 and/or the status selection 710 when select may take the user to a login screen.

Figure 8:
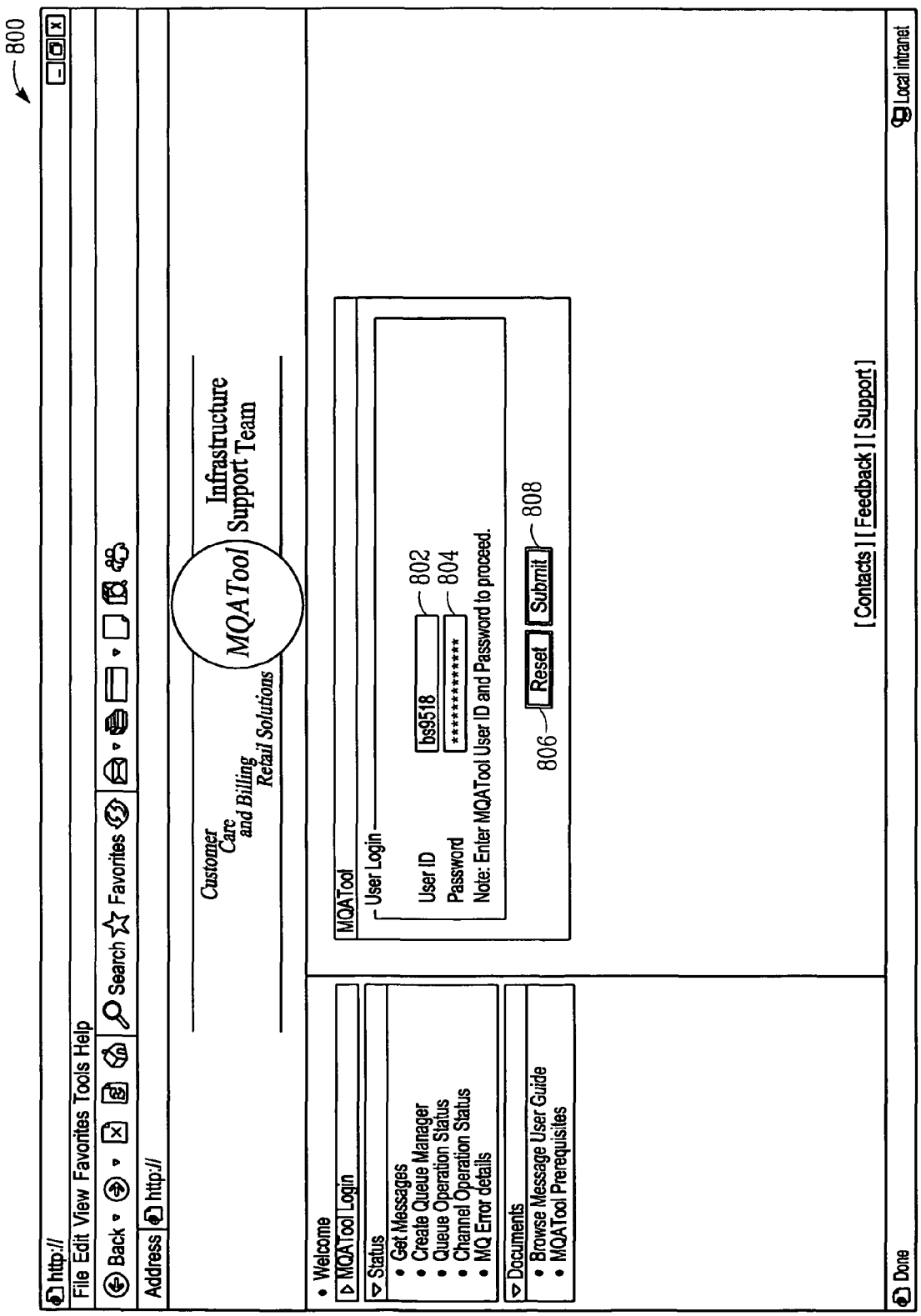

FIG. 8 illustrates an example user interface 800 according to an example embodiment. The user interface 800 may be presented to a user (e.g., by the administrative machine 102 or the client machine 118) prior to receiving a login request for the administration tool 108 (see FIG. 1). The user interface 800 may be presented to a user during the operations at block 506 (see FIG. 5), or may be otherwise presented to the user. For example, the user interface 800 may be presented based on the user selecting the login selection 702 (see FIG. 7). However, other user interfaces may also be presented to the user to receive the login request.

The user interface 800 may include a user field 802, a password field 804, a reset button 806, and/or a submit button 808. Other implementations to enable user login to the administration tool 108 may also be used.

The user field 802 may receive a user identifier from the user. The password field 804 may receive a password from the user. The reset button 806 may enable a user to clear the user field 802 and the password field 804. The submit button 808 may submit the user identifier of the user field 802 and the password of the password field 804 to the administration tool 108 for login.

Figure 9:
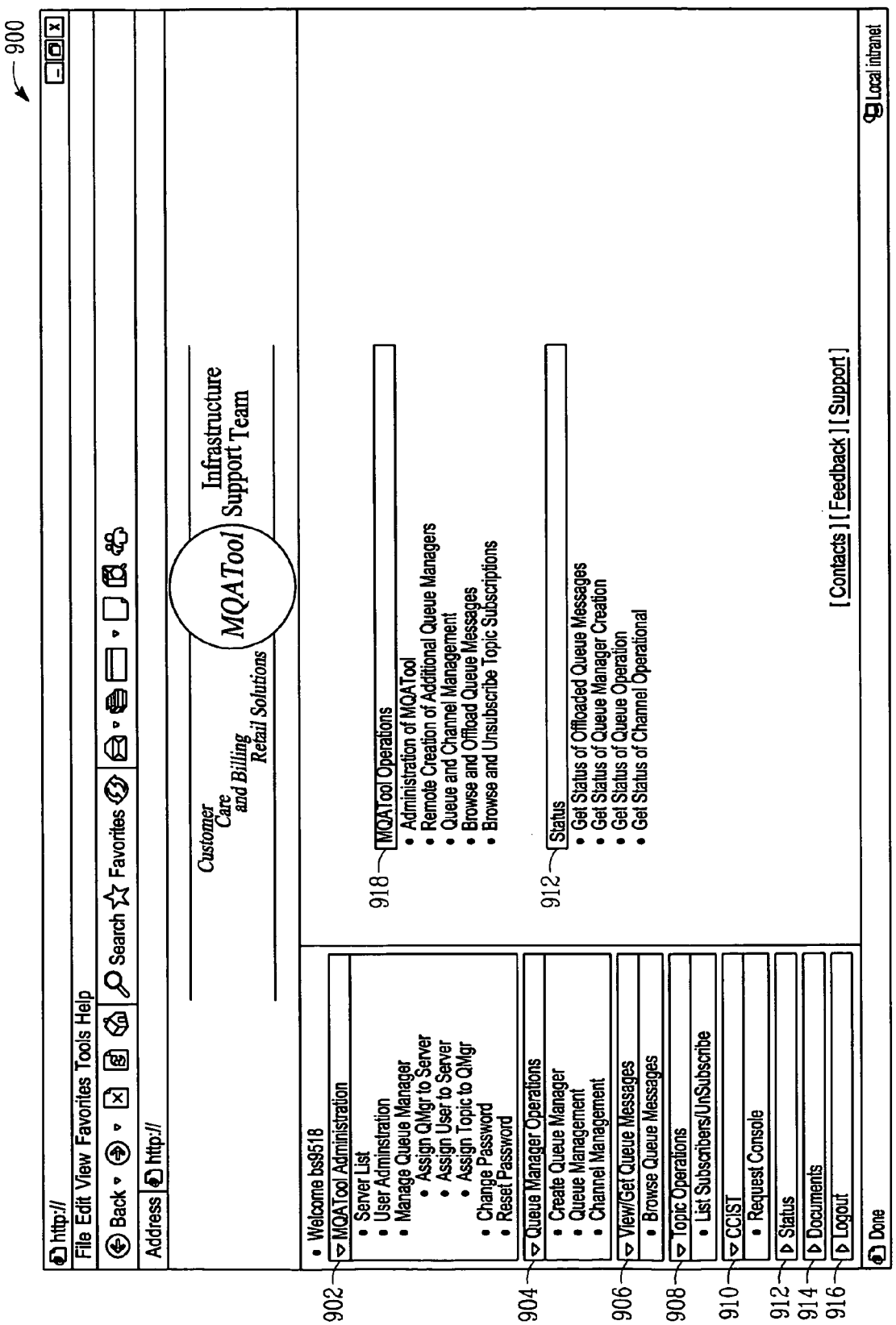

FIG. 9 illustrates an example user interface 900 according to an example embodiment. The user interface 900 may be presented to a user after login into the administration tool 108 (see FIG. 1). The user interface 900 may be presented to a user during the operations at block 506 (see FIG. 5), or may be otherwise presented to the user. For example, the user interface 900 may be presented based on the user completing the fields 802, 804 and selecting the submit button 808 (see FIG. 8). However, other user interfaces may also be presented to the user after processing the login request. The user interface 900 may be provided to the tool administrator before or during the operations at block 608 (see FIG. 6). The user interface 900 may be otherwise provided.

The user interface 900 may reflect an environment that has been assigned to a user based on group assignment. For example, certain functionality may be available to one user of a first group and not another user of a second group.

The user interface 900 may include an administration selection 902, a queue manager operations selection 904, a queue messages selection 906, a topic operations selection 908, an interfacing selection 910, a status selection 912, a documents selection 914, a logout selection 916, and/or a tool operations selection 918. Other selections may also be included. The selections 902-918 are shown in the user interface 900 as links. However, other selection formats, including buttons, may also be included. In addition, some of the selections may have sub-selections that enable selection of particular functionality.

The administration selection 902 may be selected to add a new user, provide user group separation controls, and/or assign a new user to a queue manager and/or topic. The administration section 902 of the administration tool 108 may enable assignment of groups and environment and role-based security to carry out various operations of the administration tool 108.

The queue manager operations selection 904 may be selected to launch "Create Queue Manager" to create queues and/or channels, a "Delete Manager" to delete queues and/or channels, and/or an "Update Queue Manager" to update queues and/or channels.

A "Remote Queue Manager" (QMGR) may be created with "crtmqm" system command on the destination QMGR box (e.g., the system machine 106) by establishing a telnet connection from administrative machine 102 and supplying parameters at runtime. These parameters may be dynamically populated.

The administration tool 108 may use a "MQATOOL.SVR-CONN" server connection channel to establish connection with the remote QMGR to perform various administrative tasks. On successful creation of a QMGR, a channel may be created using the "runmqsc" interface.

PCF may be used to administer the Queue and Channel objects of remote QMGR. The process may involve establishing first the communication channel with the system machine 106 with the destination QMGR box using a MQATOOL.S-VRCONN channel and executing the appropriate queue and channel PCFs commands.

The administration tool 108 may be capable of managing (e.g., creating, updating, and deleting) one or more of the following types of queue objects and channel objects: Local Queue, Alias Queue, Model Queue, Remote Queue, Create Channel, and/or Delete Channel through the queue manager operations selection 904.

The queue messages selection 906 may be selected to browse and/or offload poison and/or non-poison messages from a selected local queue. The result may be displayed in the user interface. A user may then selectively offload the messages to a text file. The functionality may be achieved through the use of PCF commands, or may be otherwise implemented.

The topic operations selection 908 may be selected to list and/or unsubscribe subscribers of one or more topics. All the subscribers, or particular subscribers of a particular topic, may be un-subscribed. The functionality may be achieved through the use of PCF commands, or may be otherwise implemented.

The interfacing selection 910 may be selected to enable interfacing with the CSID MQ series support site to receive MQ related requests and carry out the operations automatically. The administration tool 108 may interface with the CSID MQ Series support site to receive MQ related requests and carry out the operations automatically.

The administration tool 108 may be integrated with a MQ request site to automatically carry out the MQ configurations requested by end users. The request may be a simple request or a highly complex request (e.g., create multiple MQ objects in multiple queue managers running on different hosts). Once a task is complete, automatic email notifications are sent to all the designated users.

The status selection 912 may be selected to view various status pages including the history of various operations being carried out. These status pages may include get messages, create queue manager, queue operation status, and/or channel operation status. The get messages status may enable a user to view offloaded messages, dates, queues/topics, hostnames, status and user IDs. The create queue manage status may provide the status of a queue creation process. The queue operation status may provide a status of the logging of queue operations including create queue, update queue and delete queue. The channel operation status may provide a status of the logging of channel operations including create channel and delete channel.

The documents selection 914 may enable selection of available documents. The logout selection 916 may enable the user to logout of the administration tool 108.

The tool operations selection 918 may enable selection of operations of the administration tool 108. The tool operations selection 918 may include administration of the administration tool 108, remote creation of additional queue managers, queue and channel management, browse and offload queue messages, and browse and unsubscribe topic subscriptions.

FIG. 10 illustrates an example user interface 1000 according to an example embodiment. The user interface 1000 may be presented as an environment to a user. The user interface 1000 may be presented to a user during the operations at block 508 (see FIG. 5), or may be otherwise presented to the user.

The user interface 1000 may include a request identifier column 1002, a request date column 1004, a date column 1006, an application column 1008, a status column 1010, a submitted by column 1012, an assigned to column 1014, and a history column 1016 for one or more requests 1018.

The request identifier column 1002 may indicate an identifier of a request. The request date column 1004 may indicate the date of the request. The date column 1006 may indicate a desired completion of the request. The application column 1008 indicates the name of the application associated with the request. The status column 1010 indicates the status of the request. The submitted by column 1012 indicates the user that submitted the request. The assigned to column 1014 indicates an identifier number of a user to whom the request has been assigned. The history column 1016 may enable a user to view the history of a particular request 1018.

For example, the request 10011 may have a request date of Aug. 26, 2008, a desired date of Aug. 26, 2008, an application identified as being DEMO-26Aug. 2008, a status of being submitted via the web, submitted by GG57410, and assigned to nobody.

Figure 11:
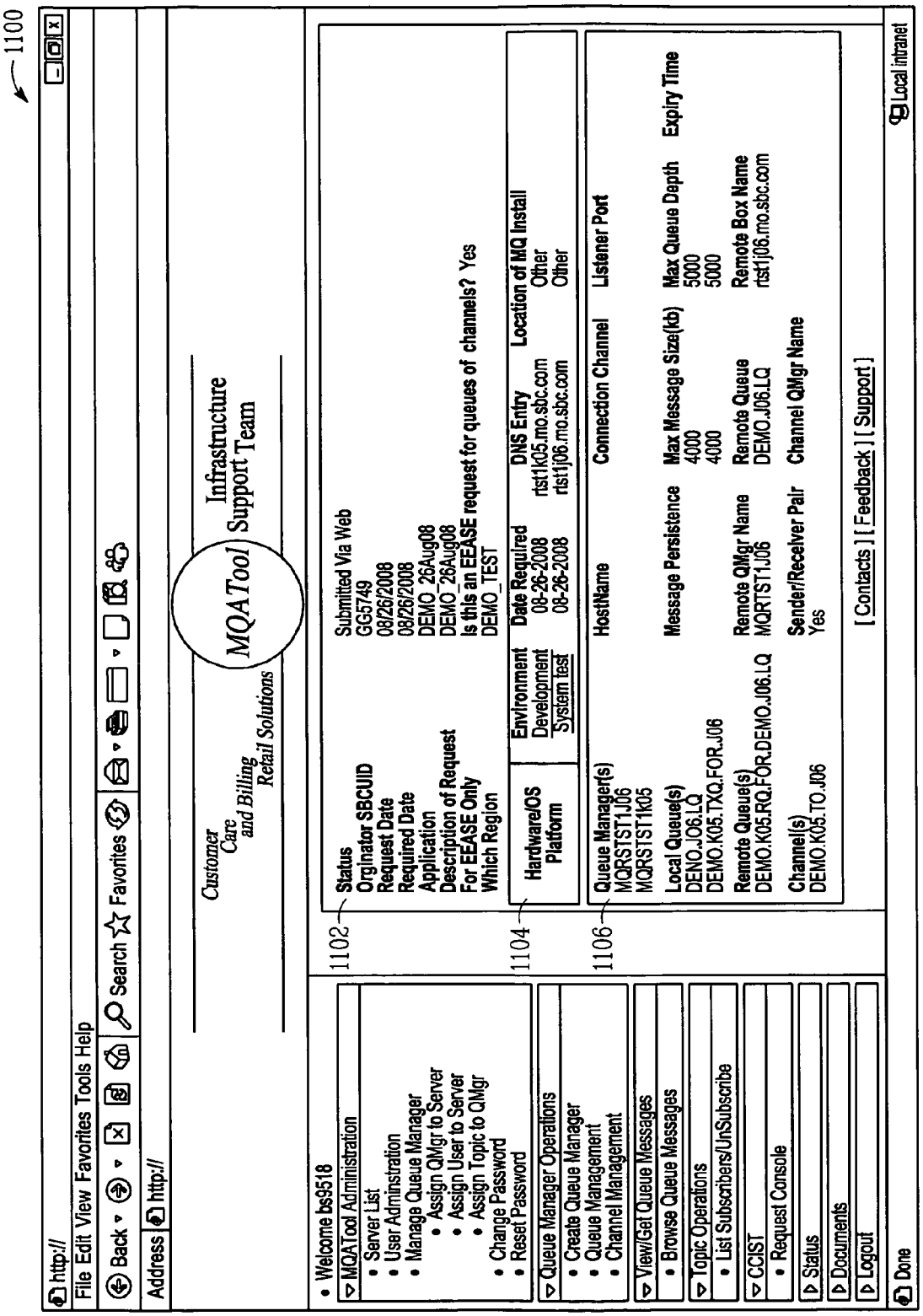

FIG. 11 illustrates an example user interface 1100 according to an example embodiment. The user interface 1100 may be presented to show details of a request. The user interface 1100 may be presented to a user during the operations at block 510 (see FIG. 5), block 610 (see FIG. 6), or may be otherwise presented to the user.

The user interface 1100 may include origination information 1102, environmental information 1104, and object name information 1106. The origination information 1102 may include a status, an originator user identifier, a request date, a required date, an application identifier, a description of the request, and other information. The environmental information 1104 may identify the hardware and operating system platform associated with the request. The object name information 1106 may include, by way of example, identification of the queue managers, local queues, remote queues, channels, host names, message persistence, remote queue managers, sender/receiver pair, connection channel, maximum message size, remote queue, channel queue manager name, listener port, maximum queue depth, remote system machine name, and expiry time.

Figure 12:
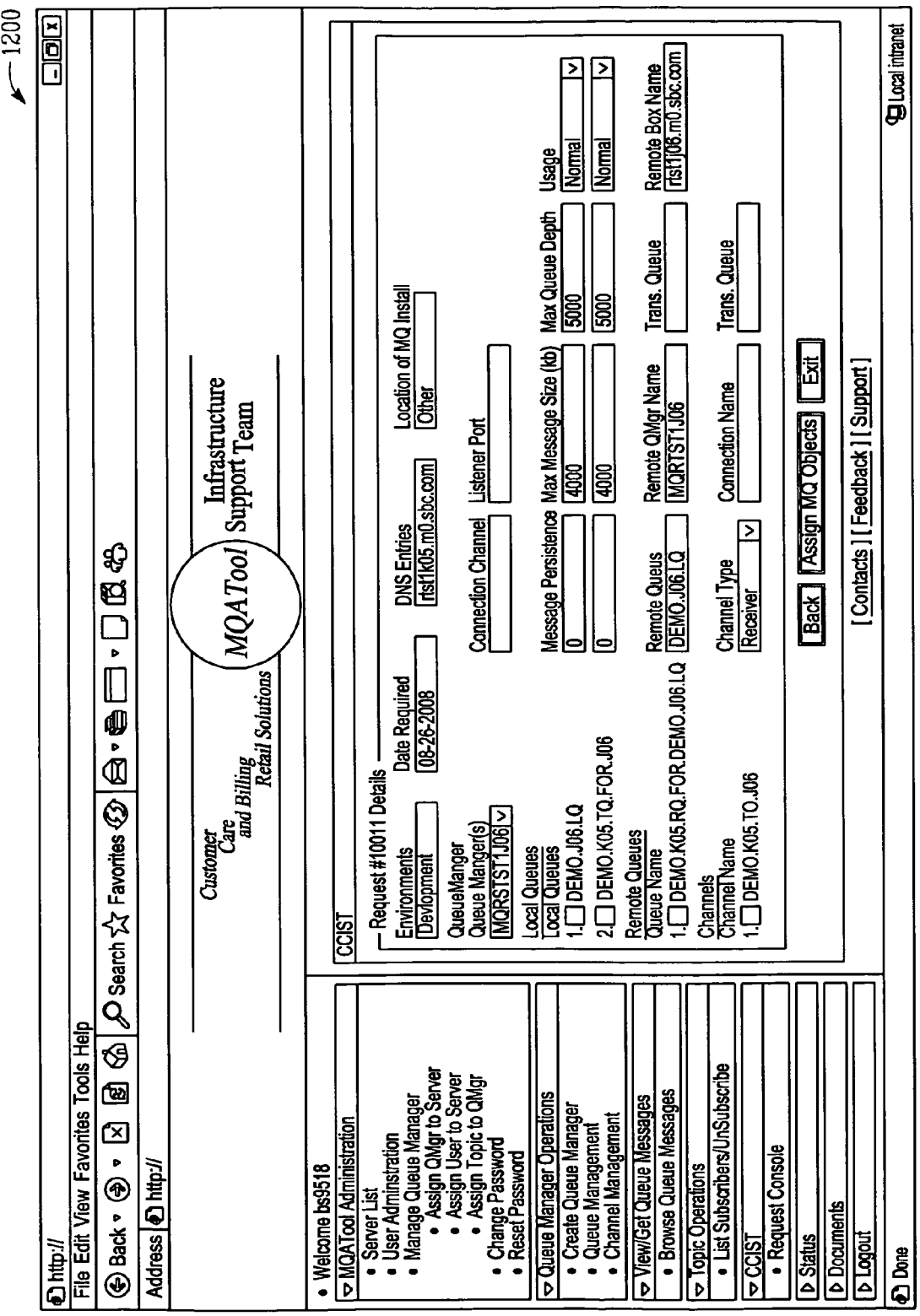
Figure 13:
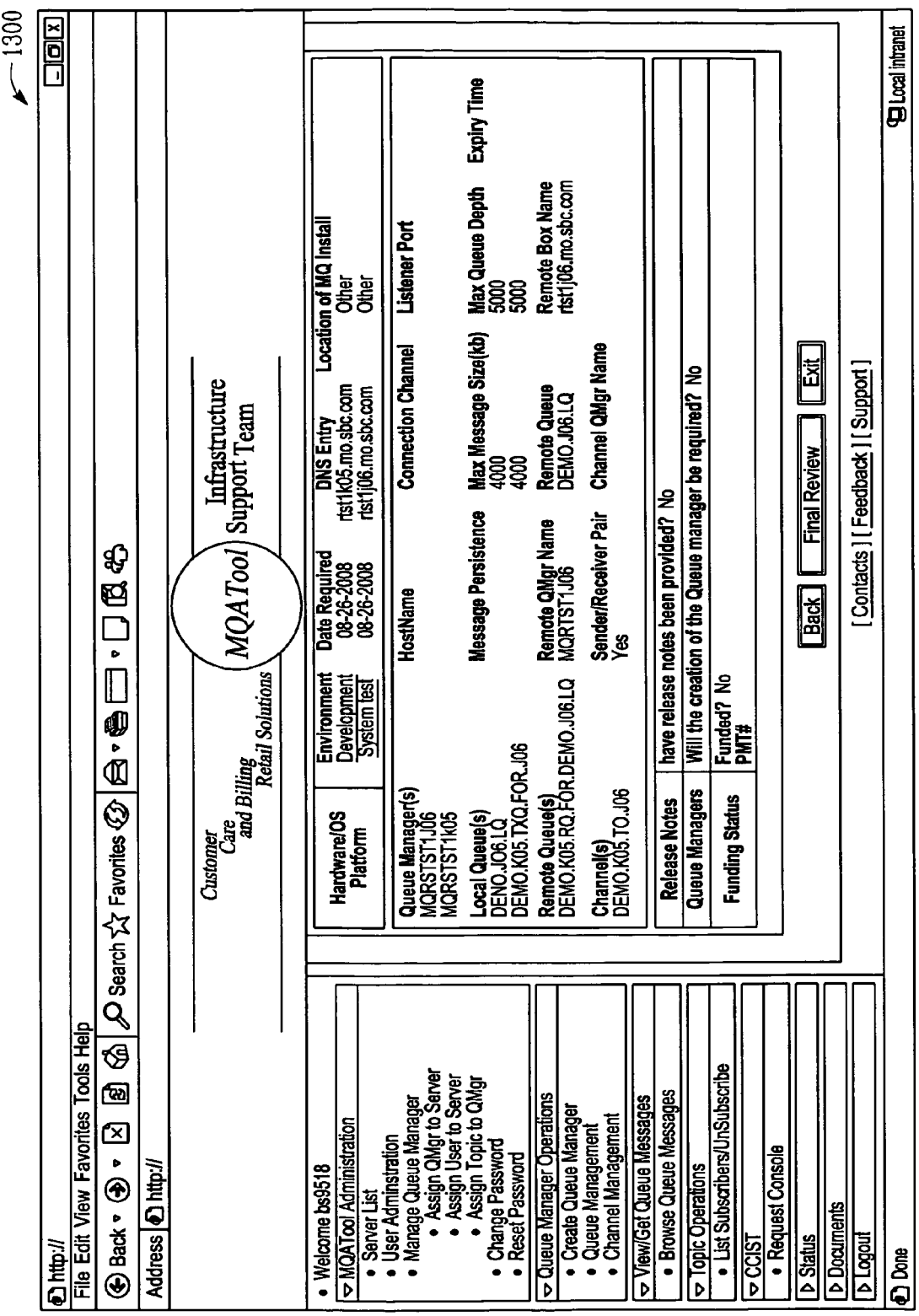

FIGS. 12 and 13 illustrate example user interfaces 1200, 1300 according to example embodiments. The user interfaces 1200, 1300 may be presented to show details of a request being provided by a user. The user interfaces 1200, 1300 may be presented to a user during the operations at block 510 (see FIG. 5), block 610 (see FIG. 6), or may be otherwise presented to the user. For example, the user may make a request that is accessed by the administration tool 108 during the operations at block 510 and/or block 610.

Figure 14:
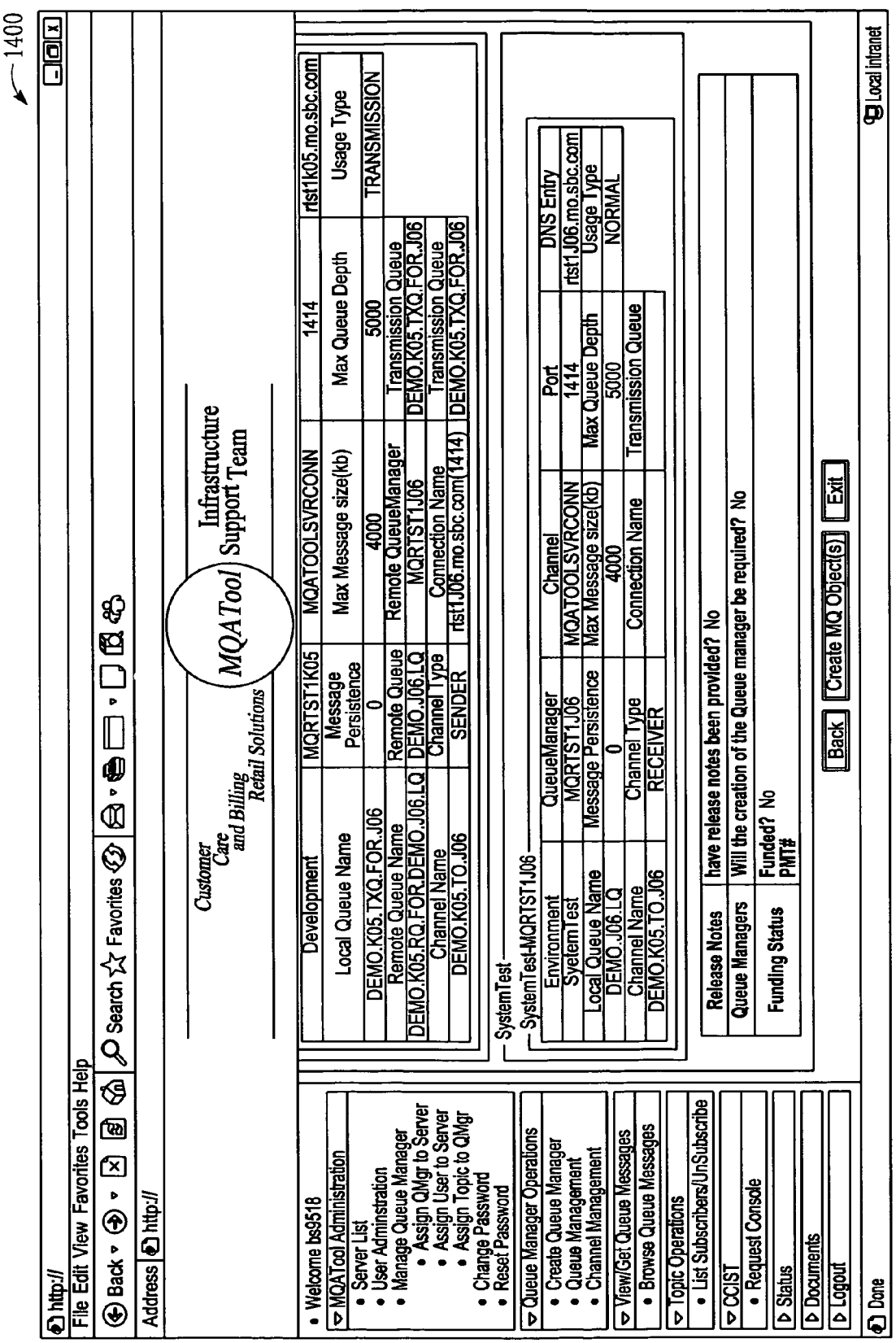

FIG. 14 illustrates an example user interface 1400 according to an example embodiment. The user interface 1400 may be presented to show details of a final review page of a request being provided to a user. The user interface 1400 may be presented to a user during the operations at block 510 (see FIG. 5), block 610 (see FIG. 6), or may be otherwise presented to the user. For example, the user may make a request that is accessed by the administration tool 108 during the operations at block 510 and/or block 610.

Figure 15:
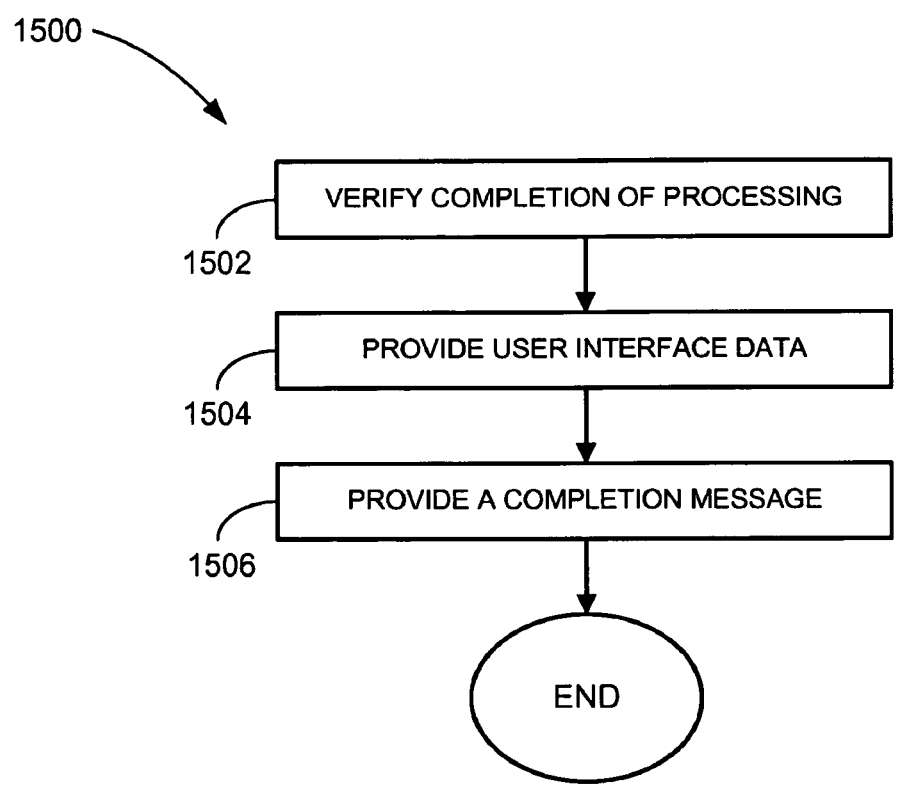
FIG. 15 is a block diagram of a flowchart illustrating a method for further processing, according to an example embodiment.

FIG. 15 illustrates a method 1500 for further processing according to an example embodiment. The method 1500 may be performed at block 518 (see FIG. 5), block 618 (see FIG. 6), or it may be otherwise performed.

Verification that the processing of the application request is complete may be made at block 1502. User interface data may be provided (e.g., through a user interface) at block 1504 based on the verification. A completion message may be provided (e.g., through a user interface) at block 1506 based on the verification.

Figure 16:
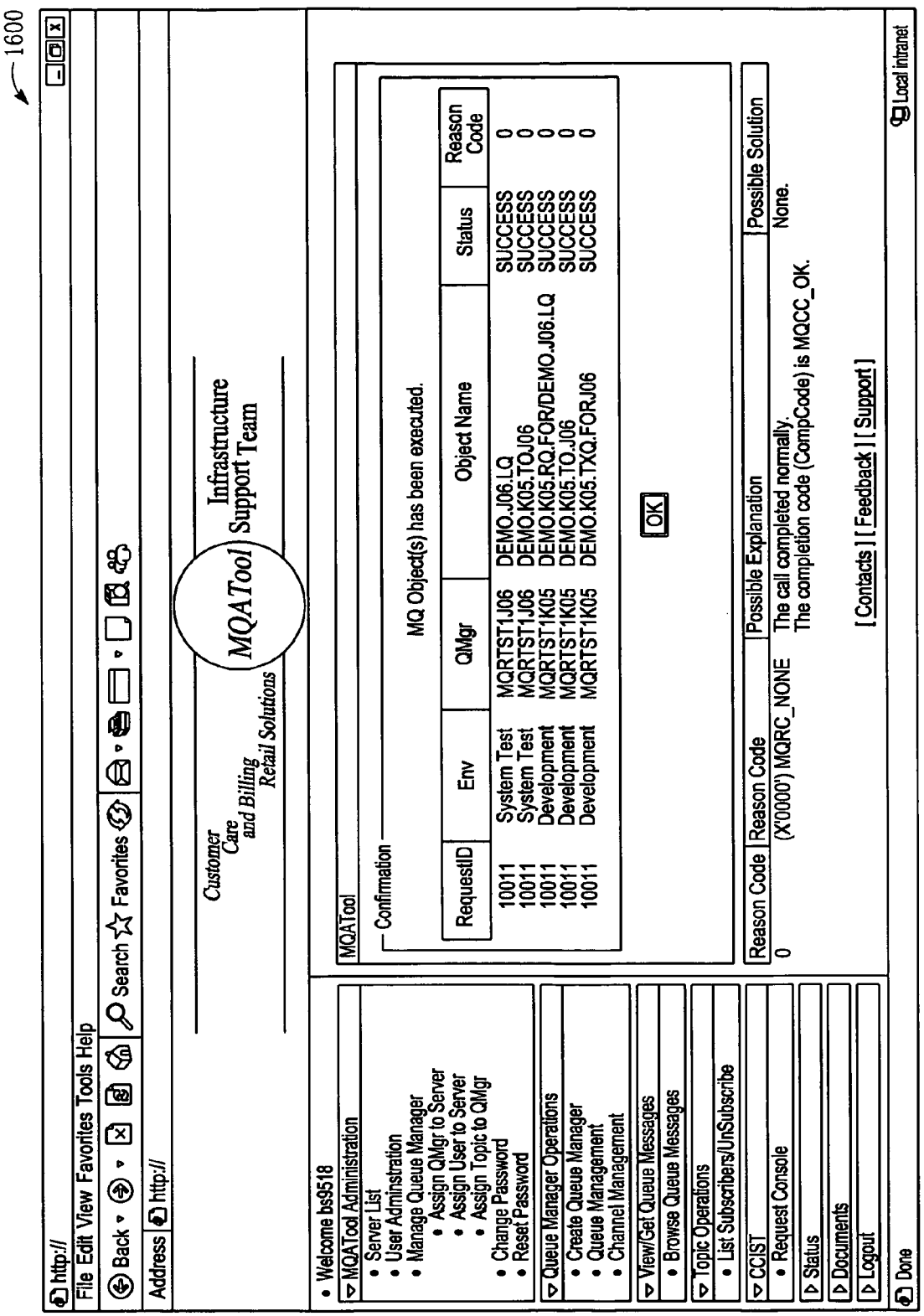
FIG. 16 is a user interface that may be presented during the methods of FIG. 15, according to an example embodiment.

FIG. 16 illustrates an example user interface 1600 according to an example embodiment. The user interface 1600 may be presented to show details of a final review page of a request being provided to a user. The user interface 1600 may be presented to a user during the operations at block 510 (see FIG. 5), block 610 (see FIG. 6), or may be otherwise presented to the user. For example, the user may make a request that is accessed by the administration tool 108 during the operations at block 510 and/or block 610.

Figure 17:
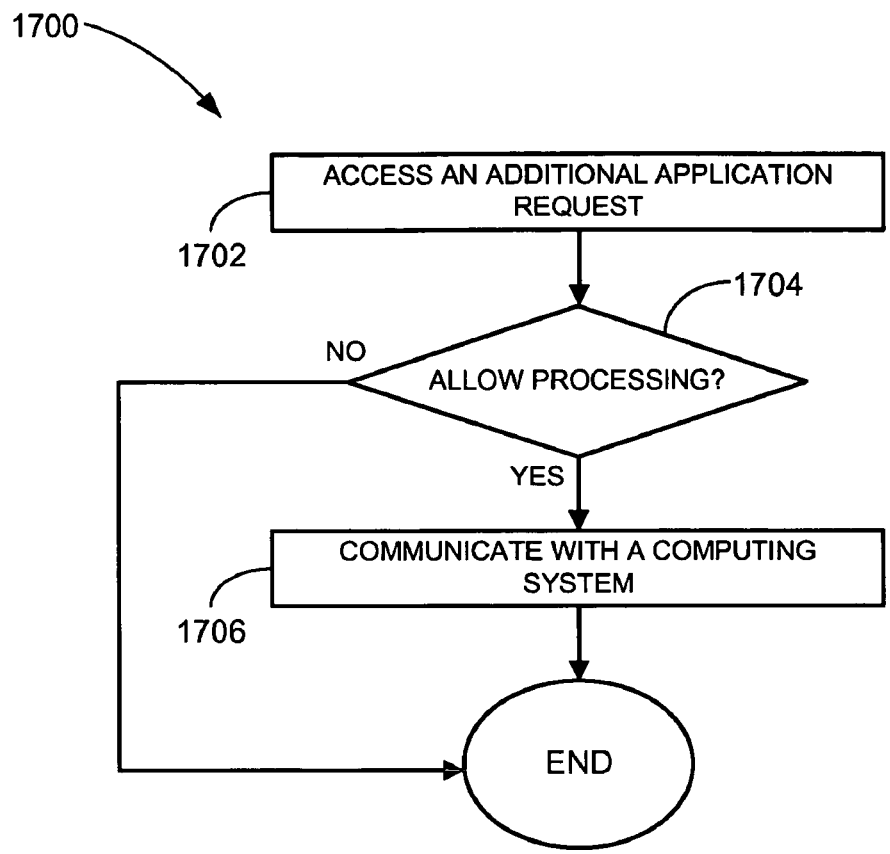
FIGS. 17 and 18 are block diagrams of flowcharts illustrating methods for further processing, according to an example embodiment.

FIG. 17 illustrates a method 1700 for further processing according to an example embodiment. The method 1700 may be performed at block 518 (see FIG. 5), block 618 (see FIG. 6), or it may be otherwise performed.

An additional application request may be accessed for an additional application associated with the administration tool at block 1702. The additional application request may be associated with the user. The additional application may use a different platform than the application 110. The additional application 110 may be deployed on the same system machine 106 or an additional system machine 106.

At decision block 1704, a determination of whether to allow processing of the additional application request based on the particular access level may be made. If a determination is made that the additional application request meets the particular access level, communication based on the additional application request may be made at block 1706. If a determination is made the additional application request does not meet the particular access level at decision block 1704 or upon completion of the operations at block 1706, the method 1700 may terminate.

In an example embodiment, the method 1700 may be used to create Multiple MQ objects (e.g., MQ queues and MQ channels) in multiple places. For example, the application request may include a request to create a first MQ object in a first location and the additional application request may include a request to create a second MQ object in a second location. The first location may be different than the second location. The objects may be created in different regions, different environments, different queue managers, different platforms, or the like.

Figure 18:
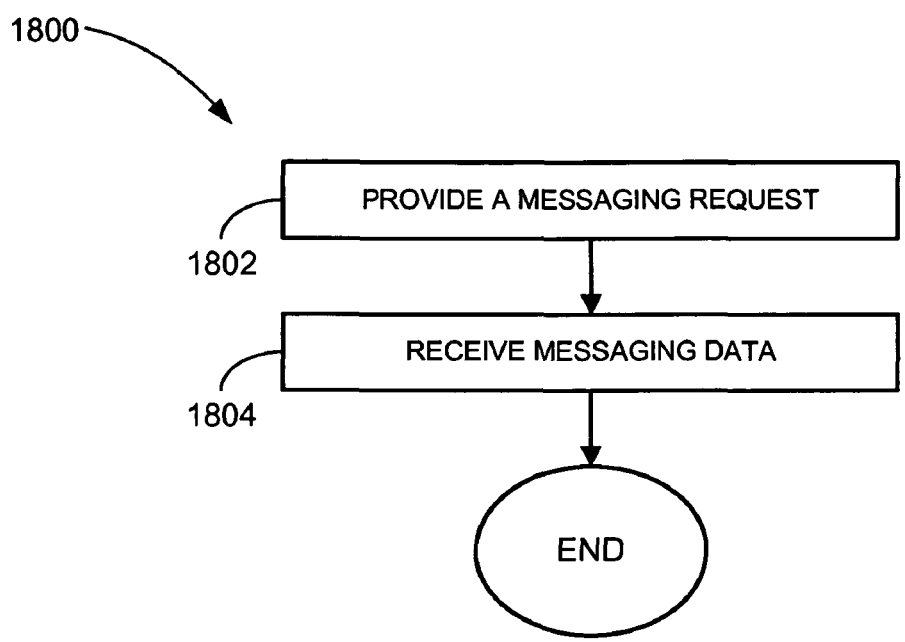

FIG. 18 illustrates a method 1800 for further processing according to an example embodiment. The method 1800 may be performed at block 518 (see FIG. 5), block 618 (see FIG. 6), or it may be otherwise performed.

A messaging request may be provided to the system machine 106 at block 1802. At block 1804, messaging data may be received by the administration tool 108 through a feed from system machine 106. The messaging data may include a header and core data. The receipt of the messaging data may be in response to providing the messaging request.

Figure 19:
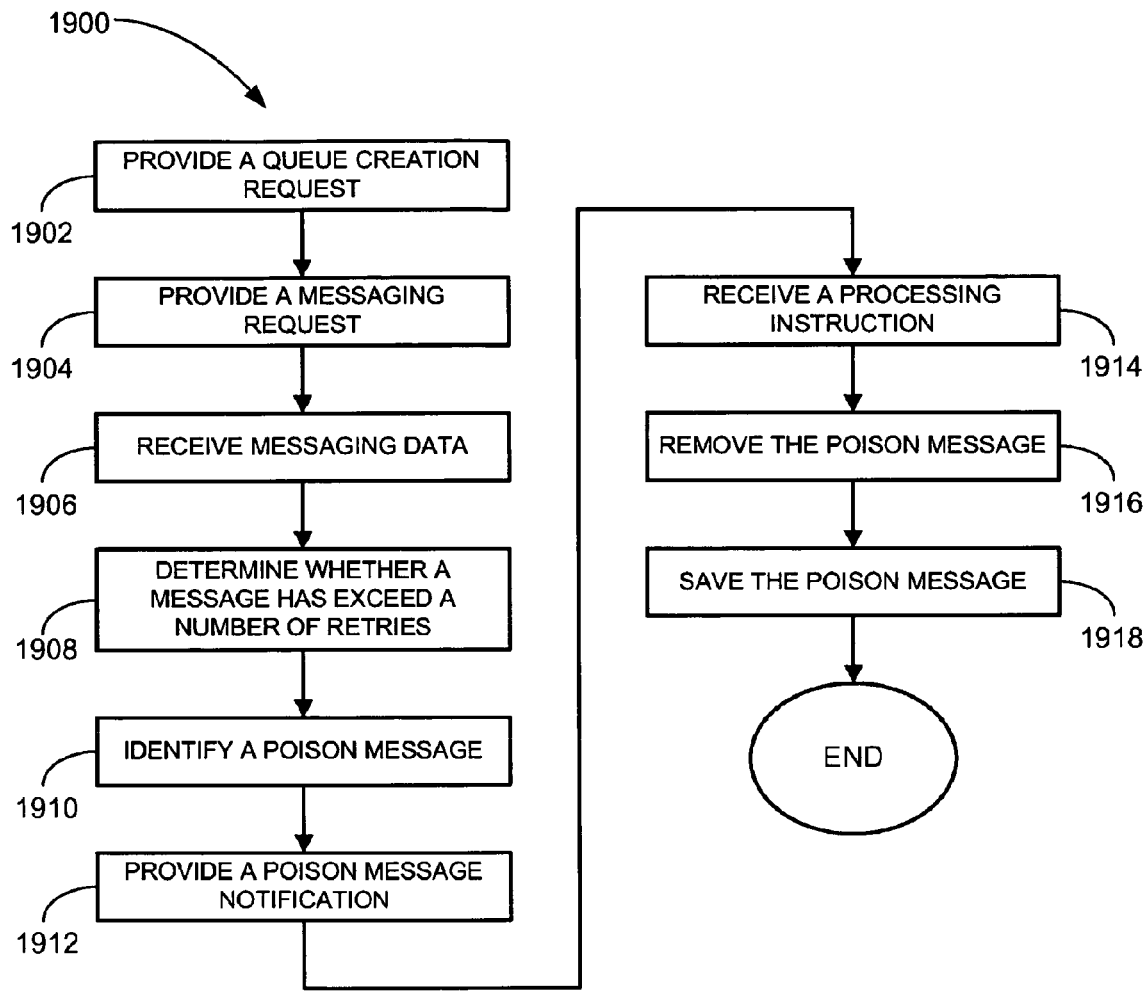
FIG. 19 is a block diagram of a flowchart illustrating a method for poison message processing, according to an example embodiment.

FIG. 19 illustrates a method 1900 for poison message processing according to an example embodiment. The method 1900 may be performed by the administrative machine 102 (see FIG. 1) of the system 100, or it may be otherwise performed.

Additional resources may be used on the system machine 106 when a poison message is in a queue. The existence of the poison message may cause increased demand on the performance and throughput of the application 110. By removing the poison message, appropriate performance for the application 110 may be restored.

A queue creation request may be provided to the application 110 at block 1902. A messaging request may be provided to the application 110 at block 1904.

Messaging data associated with a number of messaging service messages is received in a queue from the application 110 at block 1906. The messaging service message may be a communication between the application 110 on the system machine 106 and another application or client. The messaging service messages may be loosely coupled, reliable, and asynchronous messages provided between various components in an enterprise system. The messaging service messages may include, by way of example, a Java Messaging Service (JMS) message, a XML message, a SOAP message, or the like. The messaging service messages may be within a queue of a number of available queues associated with the administration tool 108. The messaging data may be received in response to providing the messaging request. The messaging data may be received by an administration tool 108, or otherwise received.

A determination of whether a message of the messaging service messages has exceeded a maximum number of retries may be determined at block 1908.

A poison message is identified among the available messaging service messages at block 1910. The poison message may include bad data that cannot be processed by the application 110 or invalid data (e.g., a stuck message that prevents the application 110 from further processing). The poison message may include a header and core data. The identification of the poison message may be based on a determination that the particular message has exceeded the maximum number of retries.

A poison message notification may be provided (e.g., to a user) at block 1912 based on identification of the poison message. A processing instruction is received for the poison message at block 1914.

The poison message is removed from the queue in response to receiving the processing instruction at block 1916. The poison message may be saved at block 1918.

Figure 20:
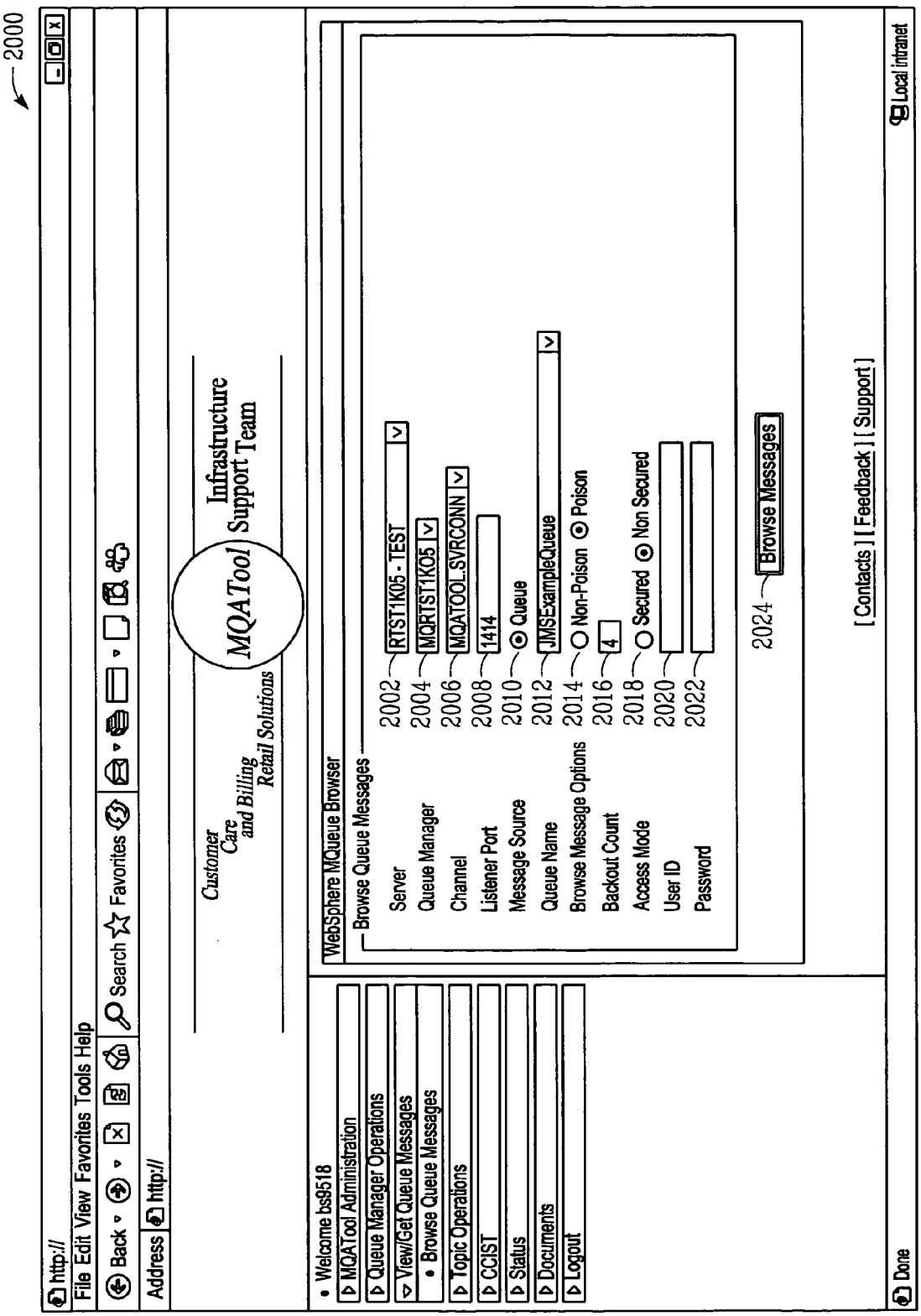
FIGS. 20-23 are user interfaces that may be presented during the method of FIG. 19, according to example embodiments.

FIG. 20 illustrates an example user interface 2000 according to an example embodiment. The user interface 2000 may be presented a user to browse messages in a queue to determine whether a poison message may be identified. The user interface 2000 may be presented to a user before or during the operations at block 1910 (see FIG. 19), or may be otherwise presented to the user.

The user interface 2000 may include a server selection 2002, a queue manager selector 2004, a channel selector 2006, a listener port field 2008, a message source selector 2010, a queue name selector 2012, a browse message option selector 2014, a backout count field 2016, an access mode selector 2018, a user identifier field 2020, a password field 2022, and/or a browse messages button 2024.

The server selection 2002 may enable a user to select the system machine 106 (e.g., in the form of a server) on which the user would like to browse messages. The queue manager selector 2004 may enable the user to select the queue manager on which the user would like to browse messages. The channel selector 2006 may enable the user to select the channel on which the user would like to browse messages.

The listener port field 2008 may enable a user to select a listener port. The message source selector 2010 may enable a user to select a message source (e.g., a queue). The queue name selector 2012 may enable a user to select a particular queue on which to browse messages.

The browse message option selector 2014 may enable a user to select viewing messages that have been identified as poison message or non-poison messages. The backout count field 2016 may enable the user to specify a backout count. The backout count may be a number that indicates when a queue reaches a certain level, the messages that have not timed out may be automatically rerouted to the backout queue.

The access mode selector 2018 may enable a user to specify whether access to the administration tool 108 is being made in a secure manner or a non-secured manner. The user identifier field 2020 and the password field 2022 may enable the user to specify a user identifier and a password respectively. The browse messages button 2024 may be selected when the user is ready to browse messages.

Figure 21:
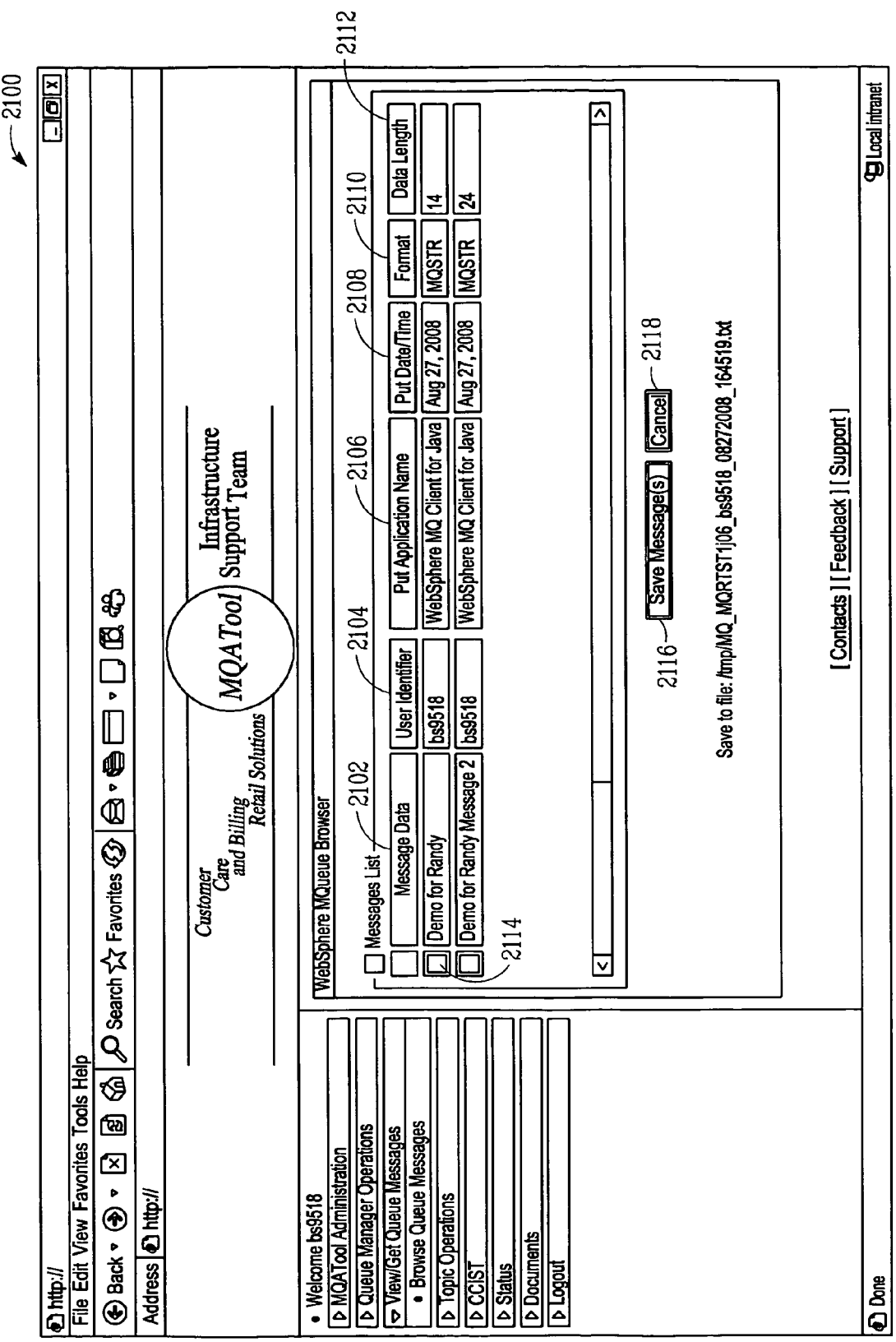

FIG. 21 illustrates an example user interface 2100 according to an example embodiment. The user interface 2100 may be presented to browse messages in a queue that have been identified as poison messages. The user interface 2100 may be presented to a user during or after the operations at block 1912 (see FIG. 19), or may be otherwise presented to the user.

The user interface 2100 may include a message data column 2102, a user identifier column 2104, a put application name column 2106, a put date/time column 2108, a format column 2110, and a data length column 2112 for a number of poison messages 2114.

The message data column 2102 may provide information that identifies the poison messages 2114. The user identifier column 2104 may provide a user identifier of a user associated with the poison messages 2114.

The put application name column 2106 includes information about the application 110 of which the message queue is associated. The put date/time column 2108 indicates the date and/or time at which the poison messages 2114 were identified. The format column 2110 indicates the format of the poison messages 2114. The data length column 2112 indicates the data length of the poison messages 2114.

The user may select one or more of the poison messages 2114 and select a save message button 2116 to save the poison message, or may press a cancel button 2118 to cancel operations.

Figure 22:
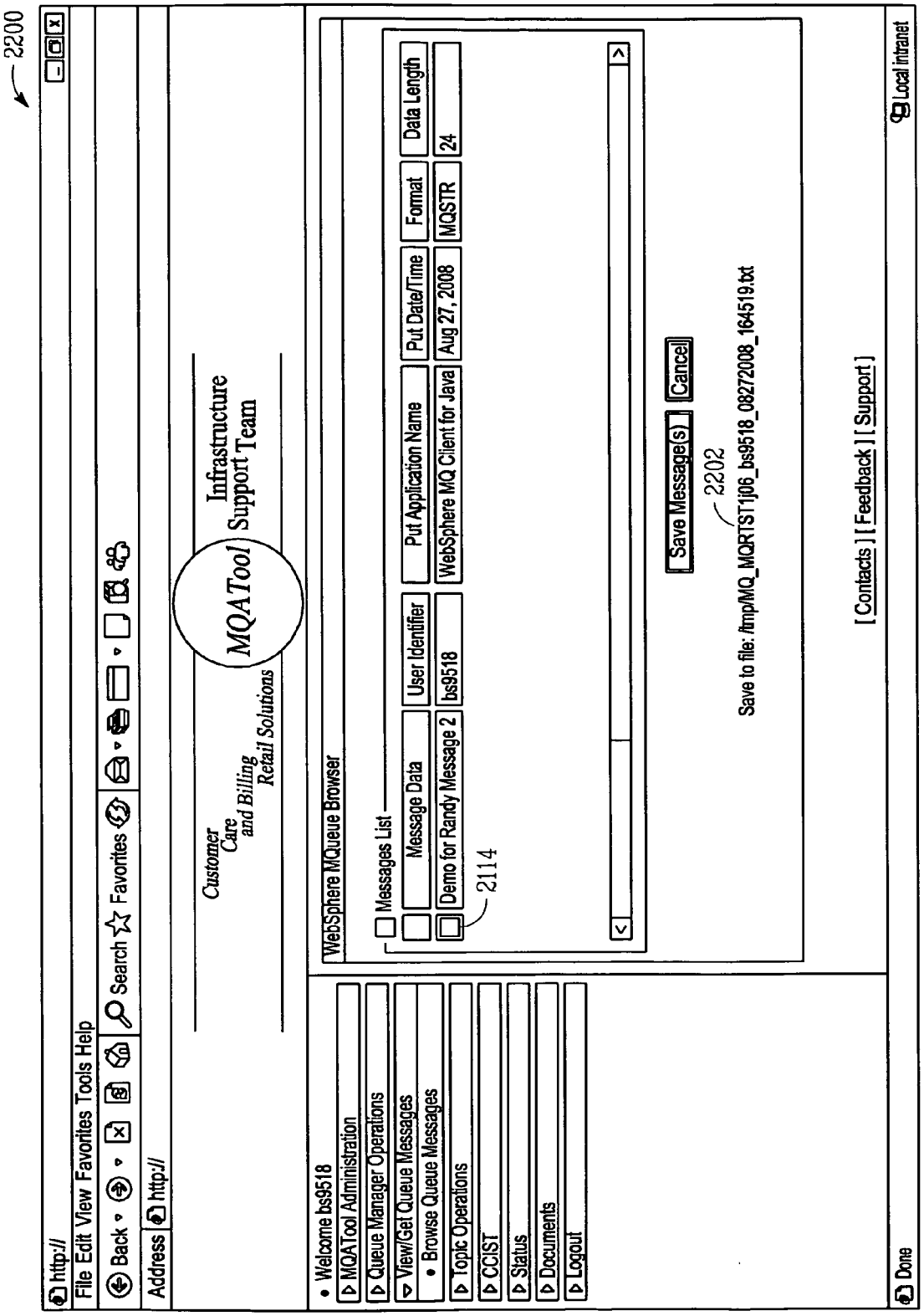

FIG. 22 illustrates an example user interface 2200 according to an example embodiment. The user interface 2200 may be presented to browse messages in a queue that have been identified as poison messages. The user interface 2200 may be presented to a user during or after the operations at block 1912, block 1914, block 1916, block 1918 (see FIG. 19), or may be otherwise presented to the user.

The user interface 2200 may reflect that a poison message 2114 has been deleted and saved in a file identified by a field identifier 2202.

Figure 23:
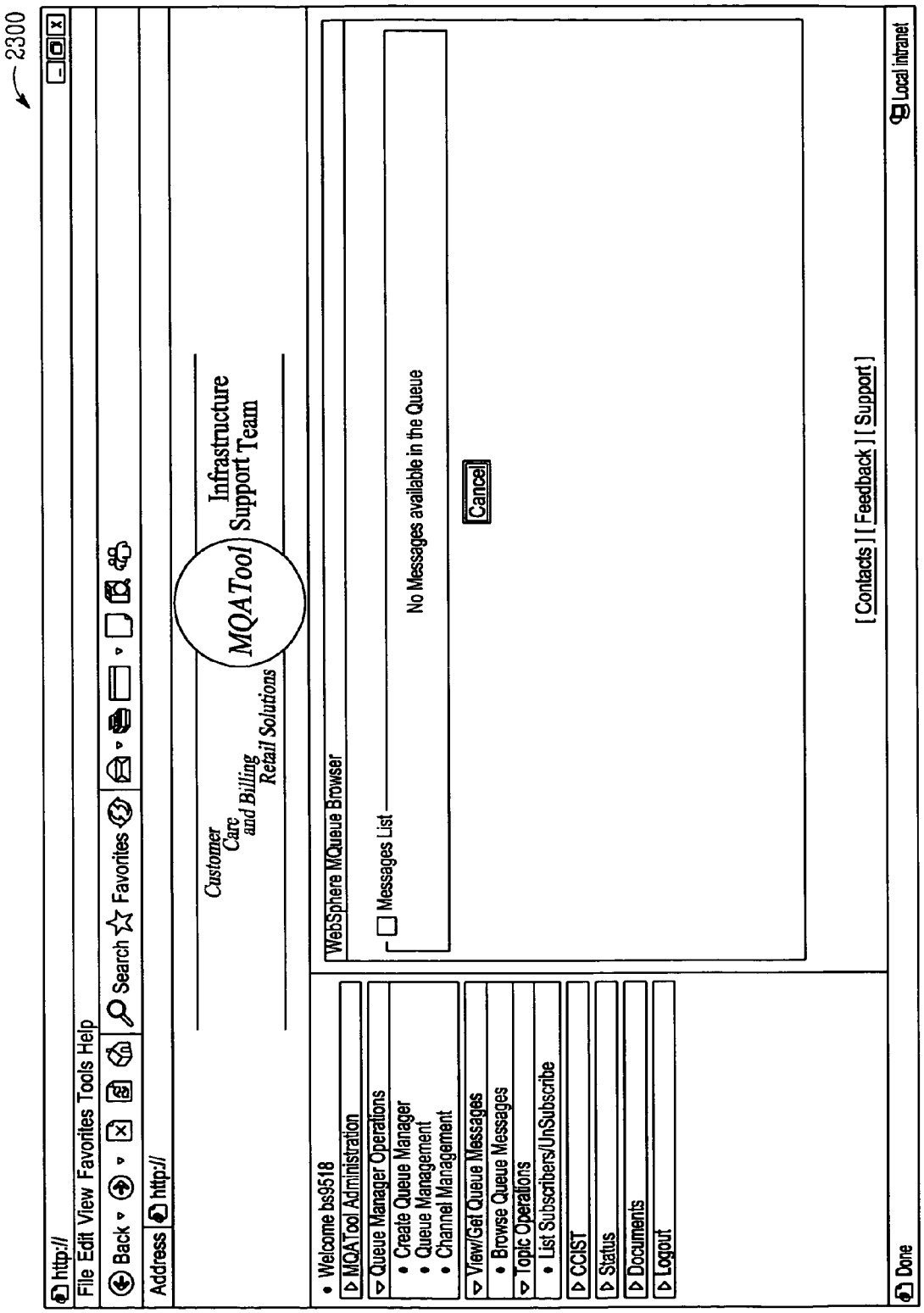

FIG. 23 illustrates an example user interface 2300 according to an example embodiment. The user interface 2300 may be presented after all poison messages have been deleted. The user interface 2300 may be presented to a user during or after the operations at block 1916 (see FIG. 19), or may be otherwise presented to the user.

Figure 24:
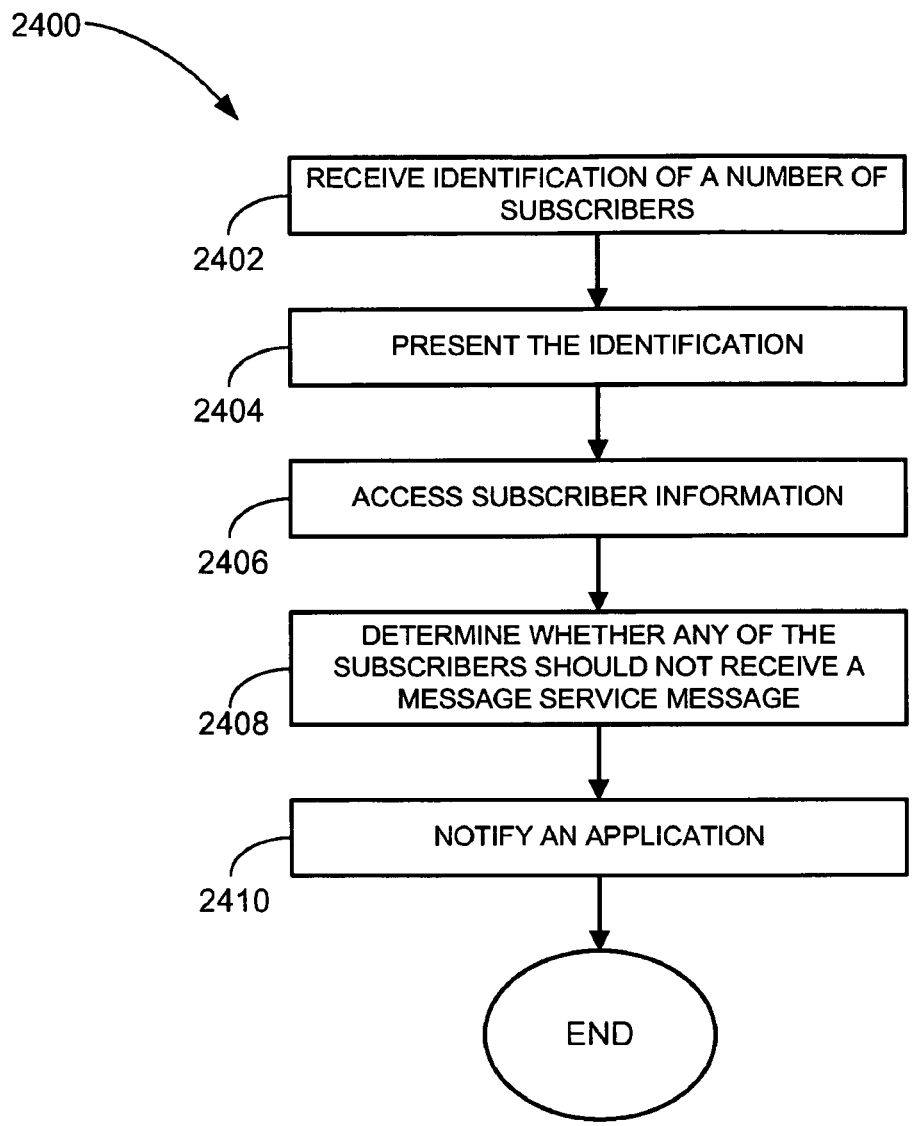
FIG. 24 is a block diagram of a flowchart illustrating a method for service message processing, according to an example embodiment.

FIG. 24 illustrates a method 2400 for service message processing according to an example embodiment. The method 2400 may be performed by the administrative machine 102 (see FIG. 1) of the system 100, or it may be otherwise performed.

The messaging for the application 110 may become stale due to an upgrade or change in subscribers or when their subscriptions are stale. The method 2400 may be used to find stale subscriptions and remove them. The message of the associated queue may then be cleared.

Identification of a number of subscribers of a topic may be received at block 2402. The identification of the subscribers of the topic may be presented at block 2404. Subscriber information is accessed for the subscribers at block 2406.

At block 2408, a determination of whether a subscriber of the subscribers should not receive a messaging service message from the application 110 based on the subscriber information may be made.

Based on the determination at block 2410, the application 110 may be notified regarding a result. The application 110 may be notified to remove the subscriber from the number f subscribers of the topic and/or to remove all subscribers of the topic.

Figure 25:
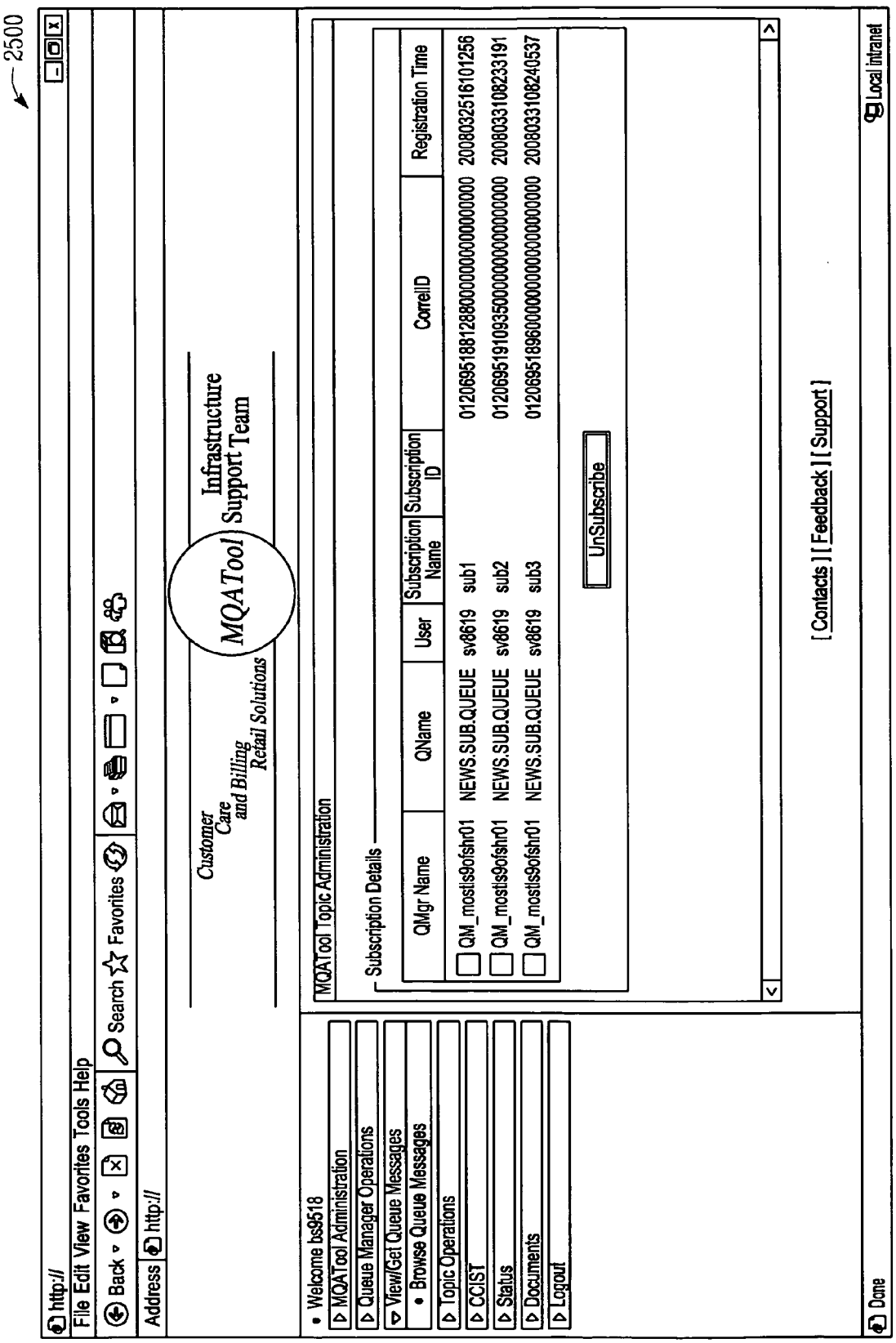
FIG. 25 is a user interface that may be presented during the method of FIG. 24, according to an example embodiment.

FIG. 25 illustrates an example user interface 2500 according to an example embodiment. The user interface 2500 may be presented to review subscriptions. The user interface 2500 may be presented to a user during the operations of the method 2400 (see FIG. 24), or may be otherwise presented to the user.

Figure 26:
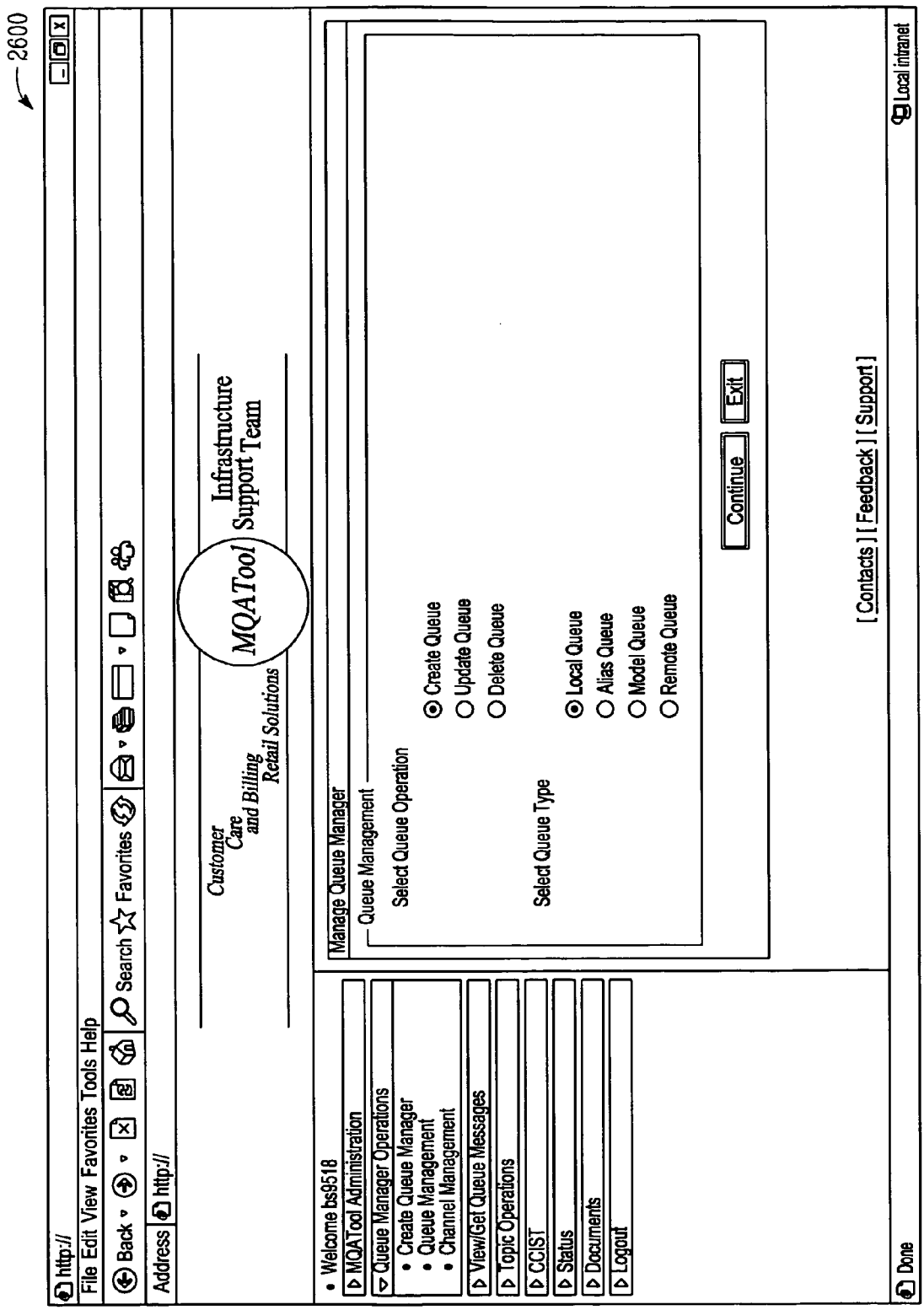
FIGS. 26 and 27 are user interfaces that may be presented to the user, according to example embodiments.

FIG. 26 illustrates an example user interface 2600 according to an example embodiment. The user interface 2600 may be presented to enable a user to view queue options.

Figure 27:
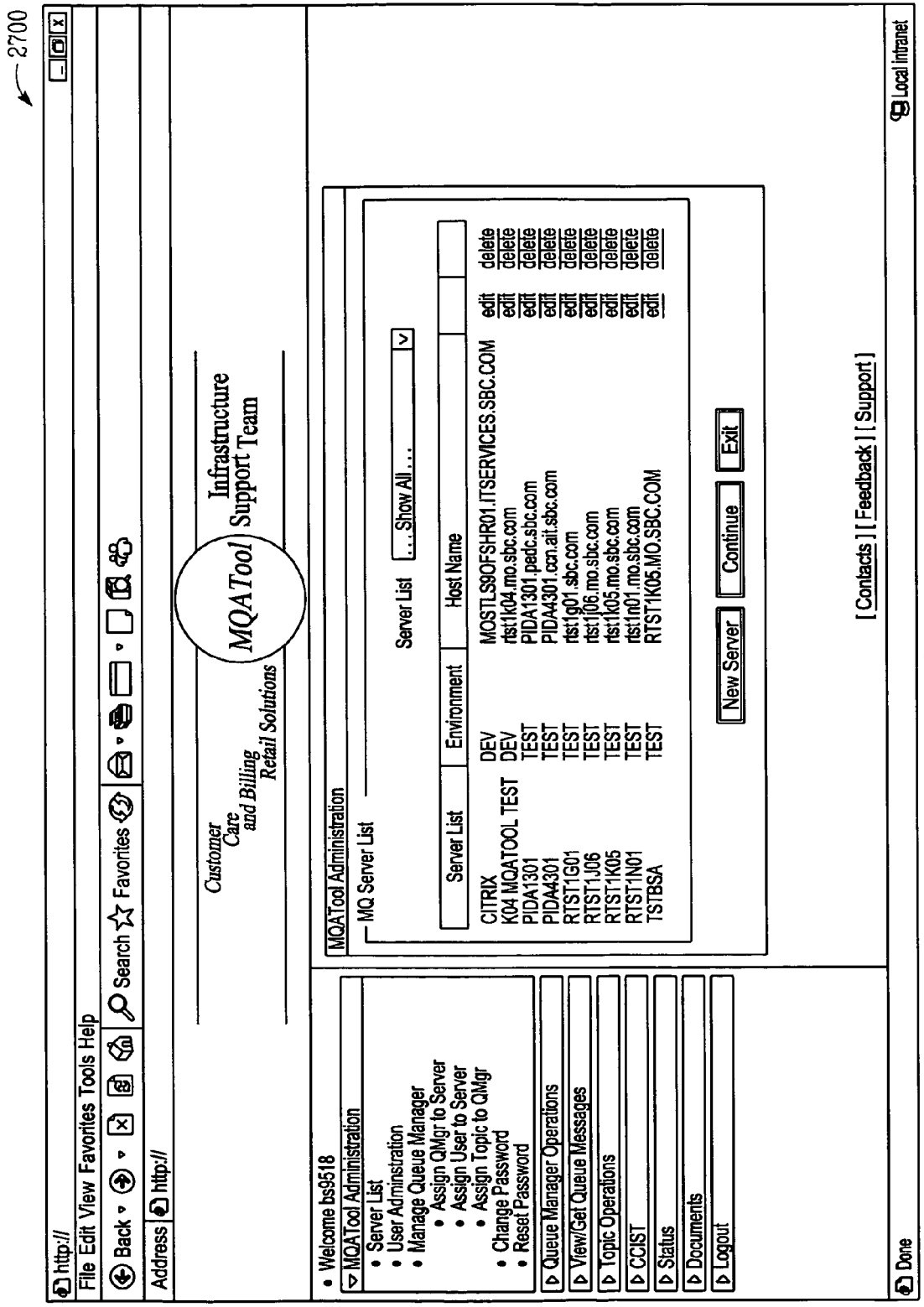

FIG. 27 illustrates an example user interface 2700 according to an example embodiment. The user interface 2700 may be presented to enable a user (e.g., a tool administrator) to view a list of the servers on the system machines 106, provide an option to create a new server on the system machines 106, or to allow a server on the system machines 106 to expire.

Figure 28:
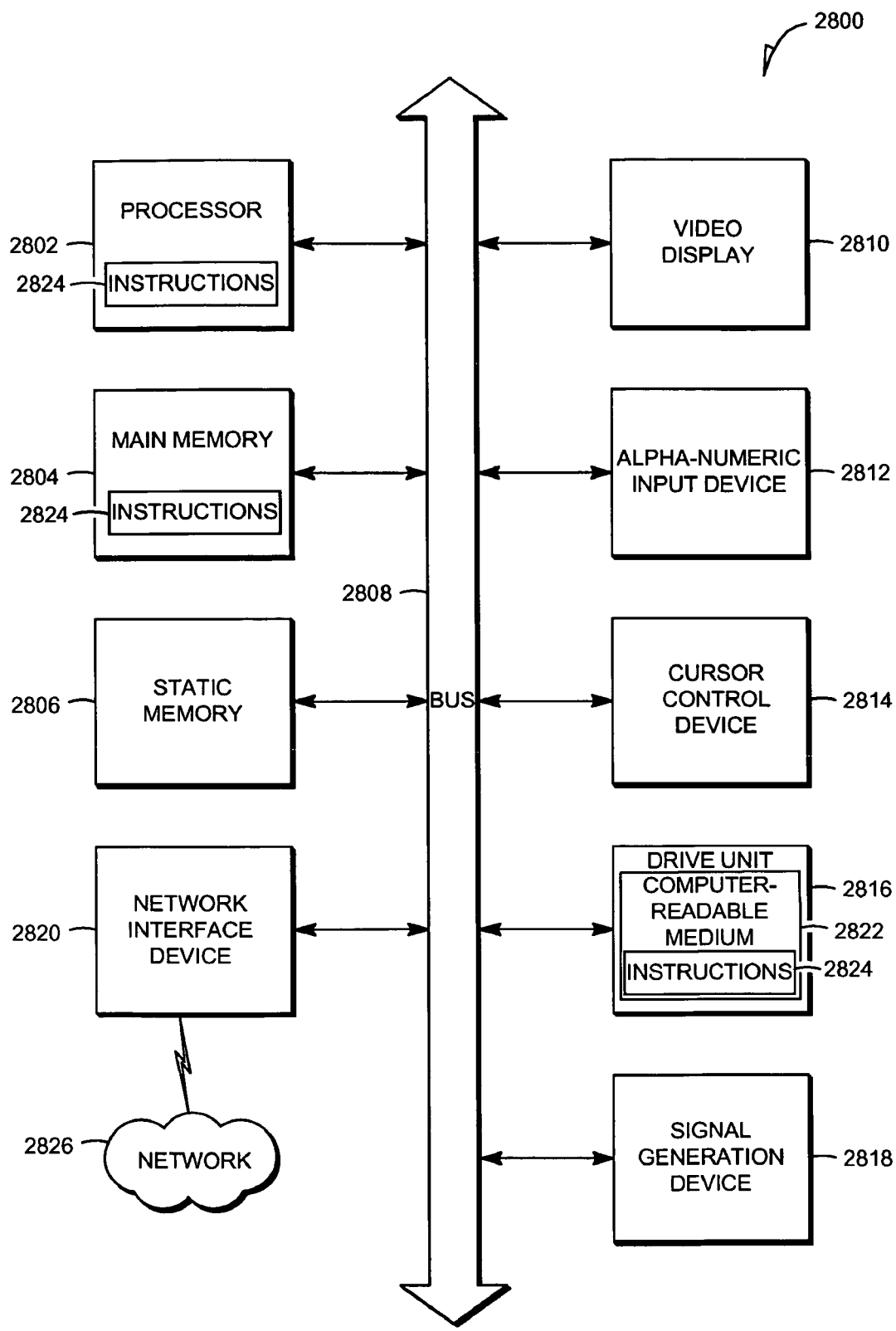
FIG. 28 is a block diagram of a machine in the example form of a computer system within which a set of instructions for causing the machine to perform any one or more of the methodologies discussed herein may be executed.

FIG. 28 shows a block diagram of a machine in the example form of a computer system 2800 within which a set of instructions may be executed causing the machine to perform any one or more of the methods, processes, operations, or methodologies discussed herein. The administrative machine 102 and/or the system machines 106 may include the functionality of the one or more computer systems 2800.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2800 includes a processor 2802 (e.g., a central processing unit (CPU) a graphics processing unit (GPU) or both), a main memory 2804 and a static memory 2806, which communicate with each other via a bus 2808. The computer system 2800 may further include a video display unit 2810 (e.g., a liquid crystal display (LCD) or a cathode ray tube (CRT)). The computer system 2800 also includes an alphanumeric input device 2812 (e.g., a keyboard), a cursor control device 2814 (e.g., a mouse), a drive unit 2816, a signal generation device 2818 (e.g., a speaker) and a network interface device 2820.

The drive unit 2816 includes a machine-readable medium 2822 on which is stored one or more sets of instructions (e.g., software 2824) embodying any one or more of the methodologies or functions described herein. The software 2824 may also reside, completely or at least partially, within the main memory 2804 and/or within the processor 2802 during execution thereof by the computer system 2800, the main memory 2804 and the processor 2802 also constituting machine-readable media.

The software 2824 may further be transmitted or received over a network 2826 via the network interface device 2820.

While the machine-readable medium 2822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled.

In an example embodiment, an application request for an application associated with an administration tool may be accessed. The application request may be associated with a user. The application may be deployed on a system machine. A particular access level of a plurality of access levels may be identified for the user on the administration tool. The particular access level may identify functionality of the administration tool available to the user. A determination of whether to allow processing of the application request based on the particular access level may be made. When the application request meets the particular access level, communication with the system machine from the administration tool may be made based on the application request. The computing system may be capable of processing the application request.

In an example embodiment, messaging data associated with a plurality of messaging service messages in a queue may be received from an application. A poison message may be identified among the plurality of messaging service messages. A processing instruction for the poison message may be received. The poison message may be removed from the queue in response to receiving the processing instruction.

In an example embodiment, identification of a plurality of subscribers of a topic may be received. Subscriber information for the plurality of subscribers may be accessed. A determination of whether a particular subscriber of the plurality of subscribers should not receive a messaging service message from an application based on the subscriber information may be made. The application may be notified regarding a result of the determining.

Thus, methods and systems for message administration have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method comprising:
providing an administration tool deployed on a first machine, the administration tool to remotely create multiple queue managers;
accessing, via the administration tool, a request to manipulate a first one of a plurality of message queues, the first one of the message queues being used to exchange messages with an application associated with the administration tool, the application being deployed on a second machine different from the first machine, the first one of the messages queues being managed by a first one of the queue managers located in a location different from the first machine, wherein the first one of the queue managers is responsible for transferring data to other ones of the queue managers via message channels;
identifying a particular access level of a plurality of access levels for a user originating the request on the administration tool, the particular access level identifying functionality of the administration tool available to the user;
determining whether to allow processing of the request based on the particular access level of the user;
when processing of the request is allowed by the particular access level, communicating the request from the administration tool to the first one of the queue managers to process the request, the request being communicated to the first one of the queue managers by embedding the request in an application data part of a message sent to the first one of the message queues, the message being formatted in a same format used for messages to be sent to the first one of the message queues for processing by the application;
identifying, via the administration tool, a poison message in the first one of the message queues, a first message in the first one of the message queues being determined to be a poison message if the first message has exceeded a threshold number of retries; and
automatically removing the poison message from the first one of the message queues.

2. The method of claim 1, further comprising:
verifying that the processing of the request is complete; and
providing user interface data based on the verifying.

3. The method of claim 1, further comprising:
verifying that the processing of the request is complete; and
providing a completion message based on the verifying.

4. The method of claim 1, further comprising:
presenting an environment based on the particular access level of the user, wherein the accessing of the request is based on the environment.

5. The method of claim 1, wherein the plurality of access levels includes a plurality of roles for the administration tool.

6. The method of claim 1, wherein the particular access level provides restricted access to the second machine.

7. The method of claim 1, wherein the application is a first application, the request is a first request, and further comprising:
accessing a second request related to a second application associated with the administration tool, the second application using a different platform than the first application;
determining whether to allow processing of the second request based on the particular access level of the user; and
when processing of the second request is allowed by the particular access level, communicating the second request to a recipient.

8. The method of claim 7, wherein the first request includes a request to create a first object in a first location and the second request include a request to create a second object in a second location, the first location being different than the second location.

9. The method of claim 1, further comprising:
receiving information from a request form;
generating the request based on the information;
notifying a tool administrator of the administration tool of the request;
receiving an approval from the tool administrator in response to the notifying of the tool administrator, wherein the accessing of the request is in response to the receiving of the approval.

10. The method of claim 1, further comprising:
receiving messaging data on the administration tool from the second machine through a feed.

11. The method of claim 1, wherein the administration tool restricts request processing based on the plurality of access levels.

12. The method of claim 1, further comprising:
receiving messaging data associated with a plurality of messaging service messages in the first one of the message queues from the application, wherein the poison message includes a header and data, the data preventing the application from performing further processing; and
moving the poison message from the first one of the message queues to a second queue for subsequent processing in response to receiving a processing instruction associated with the poison message.

13. The method of claim 12, further comprising:
saving the poison message.

14. The method of claim 1, wherein the poison message includes bad data that cannot be processed by the application.

15. A tangible machine-readable storage device comprising instructions, which when executed by one or more processors, cause the one or more processors to perform operations comprising:
providing an administration tool deployed on a first machine, the administration tool to remotely create multiple queue managers;
accessing, via the administration tool, a request to manipulate a first one of a plurality of message queues, the first one of the message queues being used to exchange messages with an application associated with the administration tool, the application being deployed on a second machine different from the first machine, the first one of the message queue queues being managed by a first one of the queue managers located in a location different from the first machine, wherein the first one of the queue managers is responsible for transferring data to other ones of the queue managers via message channels;
identifying a particular access level of a plurality of access levels for a user originating the request on the administration tool, the particular access level identifying functionality of the administration tool available to the user;
determining whether to allow processing of the request based on the particular access level of the user;
when processing of the request is allowed by the particular access level, communicating the request from the administration tool to the first one of the queue managers to process the request, the request being communicated to the first one of the queue managers by embedding the request in an application data part of a message sent to the first one of the message queues, the message being formatted in a same format used for messages to be sent to the first one of the message queues for processing by the application;
identifying, via the administration tool, a poison message in the first one of the message queues, a first message in the first one of the message queues being determined to be a poison message if the first message has exceeded a threshold number of retries; and
automatically removing the poison message from the first one of the message queues.

16. The machine-readable device of claim 15 wherein the operations further comprise:
receiving information from a request form;
generating the request based on the information;
notifying a tool administrator of the administration tool of the request;
receiving an approval from the tool administrator in response to notification of the tool administrator; and
accessing the request in response to receiving the approval.

17. The machine-readable device of claim 15 wherein the operations further comprise:
receiving messaging data associated with a plurality of messaging service messages in the first one of the message queues from the application, wherein the poison message includes a header and data, the data preventing the application from performing further processing; and
moving the poison message from the first one of the message queues to a second queue for subsequent processing in response to receiving a processing instruction associated with the poison message.

18. A system comprising:
a memory having machine readable instructions stored thereon; and
a processor to execute the instructions to perform operations comprising:
accessing a request to manipulate a first one of a plurality of message queues, the first one of the message queues being used to exchange messages with an application associated with an administration tool, the application being deployed on a second machine different from a first machine, the administration tool being deployed on the first machine, the administration tool to remotely create multiple queue managers, the first one of the message queues being managed by a first one of the queue managers located in a location different from the first machine, wherein the first one of the queue managers is responsible for transferring data to other ones of the queue managers via message channels;

identifying a particular access level of a plurality of access levels for a user originating the request on the administration tool, the particular access level identifying functionality of the administration tool available to the user;

determining whether to allow processing of the request based on the particular access level of the user;

communicating the request from the administration tool to the first one of the queue managers to process the request when processing of the request is allowed by the particular access level, the request being communicated to the first one of the queue managers by embedding the request in an application data part of a message sent to the first one of the message queues, the message being formatted in a same format used for messages to be sent to the first one of the message queues for processing by the application;

identifying a poison message in the first one of the message queues, a first message in the first one of the message queues being determined to be a poison message if the first message has exceeded a threshold number of retries; and automatically removing the poison message from the first one of the message queues.

19. The system of claim 18, wherein the application is a first application, the request is associated with the first application and a second application associated with the administration tool, the first application and the second application being located in different physical locations.

\* \* \* \* \*